US012049771B2

(12) United States Patent
Rahilly et al.

(10) Patent No.: US 12,049,771 B2
(45) Date of Patent: Jul. 30, 2024

(54) DISPENSING CABINET WITH EMERGENCY RELEASE

(71) Applicant: CareFusion 303, Inc., San Diego, CA (US)

(72) Inventors: Michael Rahilly, Encinitas, CA (US); Mariano Padilla, Zapopan (MX)

(73) Assignee: CareFusion 303, Inc., San Diego, CA (US)

( * ) Notice: Subject to any disclaimer, the term of this patent is extended or adjusted under 35 U.S.C. 154(b) by 106 days.

(21) Appl. No.: 17/733,494

(22) Filed: Apr. 29, 2022

(65) Prior Publication Data

US 2022/0349214 A1 Nov. 3, 2022

Related U.S. Application Data

(60) Provisional application No. 63/183,599, filed on May 3, 2021.

(51) Int. Cl.
*E05B 63/00* (2006.01)
*E05B 65/00* (2006.01)

(52) U.S. Cl.
CPC ...... *E05B 63/0069* (2013.01); *E05B 65/0075* (2013.01)

(58) Field of Classification Search
CPC ............ E05B 63/0069; E05B 63/0075; E05B 47/0002; E05B 47/026; E05B 65/0075; E05C 19/001; Y10S 292/65; Y10S 292/68
See application file for complete search history.

(56) References Cited

U.S. PATENT DOCUMENTS

| | | | | | |
|---|---|---|---|---|---|
| 1,515,611 | A * | 11/1924 | O'Connor | E05B 35/00 70/216 |
| 3,160,431 | A | 12/1964 | Anderson et al. | |
| 3,367,698 | A * | 2/1968 | Walker, Sr. | E05B 65/025 292/188 |
| 3,392,555 | A * | 7/1968 | Beaver | E05B 67/38 70/56 |

(Continued)

FOREIGN PATENT DOCUMENTS

| | | | |
|---|---|---|---|
| CN | 108759229 | A | 11/2018 |
| CN | 109285288 | A | 1/2019 |

(Continued)

*Primary Examiner* — Christine M Mills
*Assistant Examiner* — Faria F Ahmad
(74) *Attorney, Agent, or Firm* — Mintz Levin Cohn Ferris Glovsky and Popeo, P.C.

(57) ABSTRACT

A dispensing cabinet may include a security panel and a plunger having a disengaged position and an engaged position. The plunger may be secured in the disengaged position by the security panel. The security panel may be released in order to transition the plunger from the disengaged position to the engaged position. The dispensing cabinet may further include a lever configured to interface with the plunger and one or more latch assemblies. The lever may shift upwards in response to the plunger being transitioned from the disengaged position to the engaged position. An upward motion of the lever may release the one or more latch assemblies by rotating, to a limit, a cam bracket included in each of the one or more latch assemblies. The dispensing cabinet may be unlocked by the release of the one or more latch assemblies.

36 Claims, 31 Drawing Sheets

(56) References Cited

U.S. PATENT DOCUMENTS 4,127,966 A * 12/1978 Schmidt .............. E05B 47/0603 49/141
4,470,625 A * 9/1984 Walsh ................... E05B 65/108 292/201
4,899,077 A * 2/1990 Larson .................. G07F 11/004 312/324
5,172,970 A * 12/1992 Momose ................. E05C 9/026 292/201
5,339,662 A * 8/1994 Goldman ............ E05B 47/0002 70/432
5,421,627 A * 6/1995 Yane ..................... E05B 1/0015 292/101
5,445,326 A * 8/1995 Ferro ....................... E05B 83/26 292/DIG. 43
5,487,289 A * 1/1996 Otto, III .................. E05C 9/047 70/279.1
5,542,720 A * 8/1996 Fleming .................. E05B 63/20 292/341.15
6,149,213 A * 11/2000 Sokurenko .......... E05B 17/0037 292/DIG. 55
6,637,784 B1 * 10/2003 Hauber ................. E05B 65/087 292/300
7,168,745 B2 1/2007 Jamnia et al.
8,113,607 B2 * 2/2012 Slager ................. E05B 65/0882 49/128
2004/0108795 A1 * 6/2004 Meek, Jr. .............. E05B 47/026 312/218
2006/0032418 A1 * 2/2006 Smith ................. E05B 63/0073 70/279.1
2007/0227204 A1 * 10/2007 Shoenfeld .............. A61B 50/10 70/101
2009/0231132 A1 * 9/2009 Shoenfeld .............. A61B 50/10 70/101
2011/0056253 A1 * 3/2011 Greiner ............... E05B 47/0002 70/277
2019/0024407 A1 * 1/2019 Cheng ................. E05B 65/0864
2020/0349796 A1 11/2020 Gokcebay et al.

FOREIGN PATENT DOCUMENTS

CN 208597885 U 3/2019
CN 111210575 A 5/2020
CN 211776620 U 10/2020
GB 2302133 * 1/1997 ......... E05B 47/0673
JP H08-260785 A 10/1996
WO WO-94/15501 A1 7/1994
WO WO-2019/079468 A1 4/2019

* cited by examiner

DISPENSING CABINET WITH EMERGENCY RELEASE

CROSS REFERENCE TO RELATED APPLICATION

This application claims priority to U.S. Provisional Application No. 63/183,599, entitled "DISPENSING CABINET WITH EMERGENCY RELEASE" and filed on May 3, 2021, the disclosure of which is incorporated herein by reference in its entirety.

TECHNICAL FIELD

The subject matter described herein relates generally to medication management equipment and more specifically to a medication dispensing cabinet with an emergency release feature.

BACKGROUND

Diversion may refer to the transfer of a controlled and/or high-value substance to a third party who is not legally authorized to receive, possess, and/or consume the substance for personal use or personal gain. High-value and/or controlled prescription medications, notably opioids, may be especially prone to diversion. For instance, a prescription pain medication may be diverted when a clinician keeps the prescription pain medication for unauthorized personal use instead of administering the prescription pain medication to a patient or wasting the prescription pain medication. As such, the detection, investigation, and prevention of diversion as well as other anomalous behavior such as medical error, hazardous conduct, and protocol compliance may require controlling access to high-value and/or controlled substances.

SUMMARY

Systems, methods, and articles of manufacture are provided for a dispensing cabinet with an emergency release feature. Various high-value and/or controlled substances, such as prescription pain medications, may be stored in a dispensing cabinet configured to provide controlled access to the high-value and/or controlled substances. For example, the dispensing cabinet may be secured with an electromechanical lock, which may prevent a clinician from accessing the dispensing cabinet without verifying the clinician's identify and generating electronic records to document the interaction. Controlling access to high-value and/or controlled substances in this manner may enable the detection, investigation, and prevention of various anomalous behaviors including, for example, diversion, medical error, hazardous conduct, protocol noncompliance, and/or the like. Nevertheless, some exceptional events, such as power outages, software errors, and mechanical failures, may render the electromechanical lock inoperable. In the absence of an alternate mechanism for accessing the dispensing cabinet, clinicians may be left unable to retrieve life-saving medication stored in the dispensing cabinet. As such, in some example embodiments, the dispensing cabinet may include an emergency access feature configured to provide alternate access to the dispensing cabinet in the event the dispensing cabinet is inaccessible via the electromechanical lock.

In some example embodiments, the emergency access feature may include a plunger having a disengaged position and an engaged position. In the disengaged position, the plunger may be secured by a security panel that is accessible from the bottom of the dispensing cabinet, for example, beneath the door of the dispensing cabinet. The security panel may be configured to prevent the plunger from being transitioned to the engaged position without releasing the security panel. Moreover, the security panel may include one or more locks (e.g., padlocks, barrel locks, and/or the like) configured to maintain the security panel in a locked position in which the security panel secures the plunger in the disengaged position. The security panel may be released by unlocking the one or more locks. Releasing the security panel may enable the plunger to be transitioned from the disengaged position to the engaged position in which the plunger engages with an emergency release lever. For example, in the engaged position, the plunger may shift the emergency release lever upwards (or in a different direction) to release the one or more latches securing the door of the dispensing cabinet. Releasing the one or more latches in this manner may therefore provide access to the contents of the dispensing cabinet, for example, when the electromechanical lock securing the dispensing cabinet is rendered inoperable.

In one aspect, there is provided a dispensing cabinet with an emergency release feature. The dispensing cabinet may include: a security panel; a plunger having a disengaged position and an engaged position, the plunger being secured in the disengaged position by the security panel, and wherein the security panel is released in order to transition the plunger from the disengaged position to the engaged position; and a first lever configured to interface with the plunger and a first latch assembly, the first lever configured to shift upwards in response to the plunger being transitioned from the disengaged position to the engaged position, and an upward motion of the first lever releasing the first latch assembly to unlock the dispensing cabinet.

In some variations, one or more features disclosed herein including the following features can optionally be included in any feasible combination. The first latch assembly may include a cam bracket. The upward motion of the first lever may release the first latch assembly by at least rotating the cam bracket to a limit.

In some variations, the first latch assembly may further include a second lever configured to prevent the cam bracket from rotating beyond the limit.

In some variations, the dispensing cabinet may further include a spring coupling the first lever and the cam bracket. The cam bracket may be disposed at least partially inside a slot in the first lever. The cam bracket may be rotated by a tension of the spring against the cam bracket while the first lever is shifted upwards by the plunger transitioning to the engaged position.

In some variations, the dispensing cabinet may further include a bracket secured to a side panel of the dispensing cabinet. The bracket may include a first finger configured to support the plunger in the disengaged position and a second finger configured to support the plunger in the engaged position.

In some variations, the cam bracket may be rotated to the limit to unlock the dispensing cabinet by at least moving the bracket upwards while the plunger is in the disengaged position.

In some variations, the security panel may be released by at least unlocking one or more locks maintaining the security panel in a locked position.

In some variations, the one or more locks may include a padlock. The dispensing cabinet may include a staple configured to engage with a shackle of the padlock.

In some variations, the one or more locks may include a barrel lock in the security panel. The barrel lock may include a cam configured to engage with a slot in a sheet metal assembly in the dispensing cabinet.

In some variations, the security panel may include a tamper guard to prevent unauthorized access to the one or more locks.

In some variations, the tamper guard may include one or more pieces of material forming at least a partial enclosure around the one or more locks.

In some variations, the dispensing cabinet may further include a skirt concealing at least a portion of the security panel.

In some variations, the plunger may be visible through a cutout in the security panel.

In some variations, the first lever may be configured to interface with a second latch assembly. The upward motion of the first lever may further release the second latch assembly to unlock the dispensing cabinet.

In some variations, the release of the first latch assembly may unlock one or more doors comprising the dispensing cabinet.

In some variations, the first lever and the first latch assembly may be disposed inside a U-channel to form a U-channel assembly.

In some variations, the U-channel assembly and the plunger may be disposed on one side of the dispensing cabinet. A hinge of one or more doors of the dispensing cabinet may be disposed on an opposite side of the dispensing cabinet.

In some variations, the dispensing cabinet may further include an access detection feature configured to generate a signal in response to the upward motion of the first lever.

In some variations, the access detection feature may include an electromechanical switch configured to transition between an open position and a closed position in response to the upward motion of the first lever.

In some variations, the access detection feature may include an optical sensor configured to detect the upward motion of the first lever.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing emergency access to a dispensing cabinet, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1B:
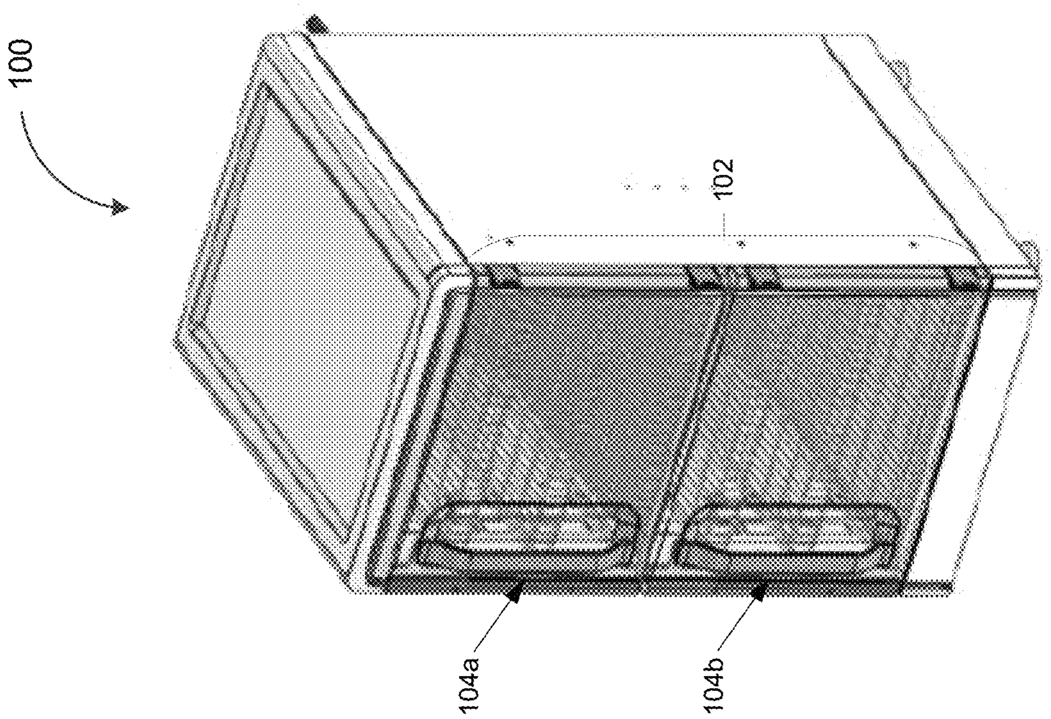
FIG. 1B depicts a perspective view of another example of a dispensing cabinet, in accordance with some example embodiments.
Figure 1A:
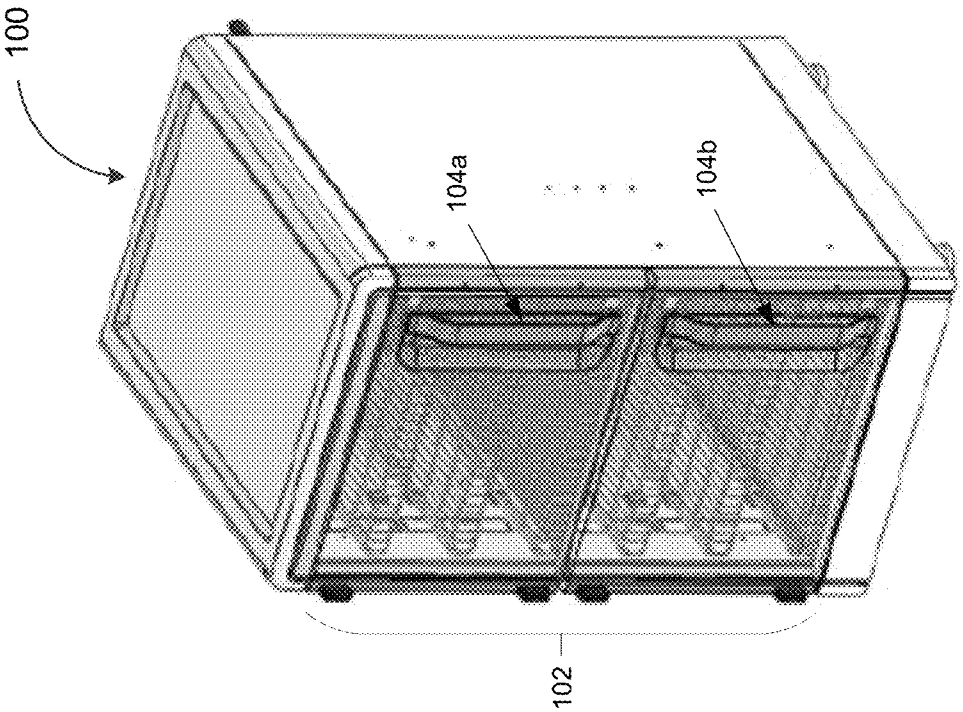
FIG. 1A depicts a perspective view of an example of a dispensing cabinet, in accordance with some example embodiments.
Figure 1C:
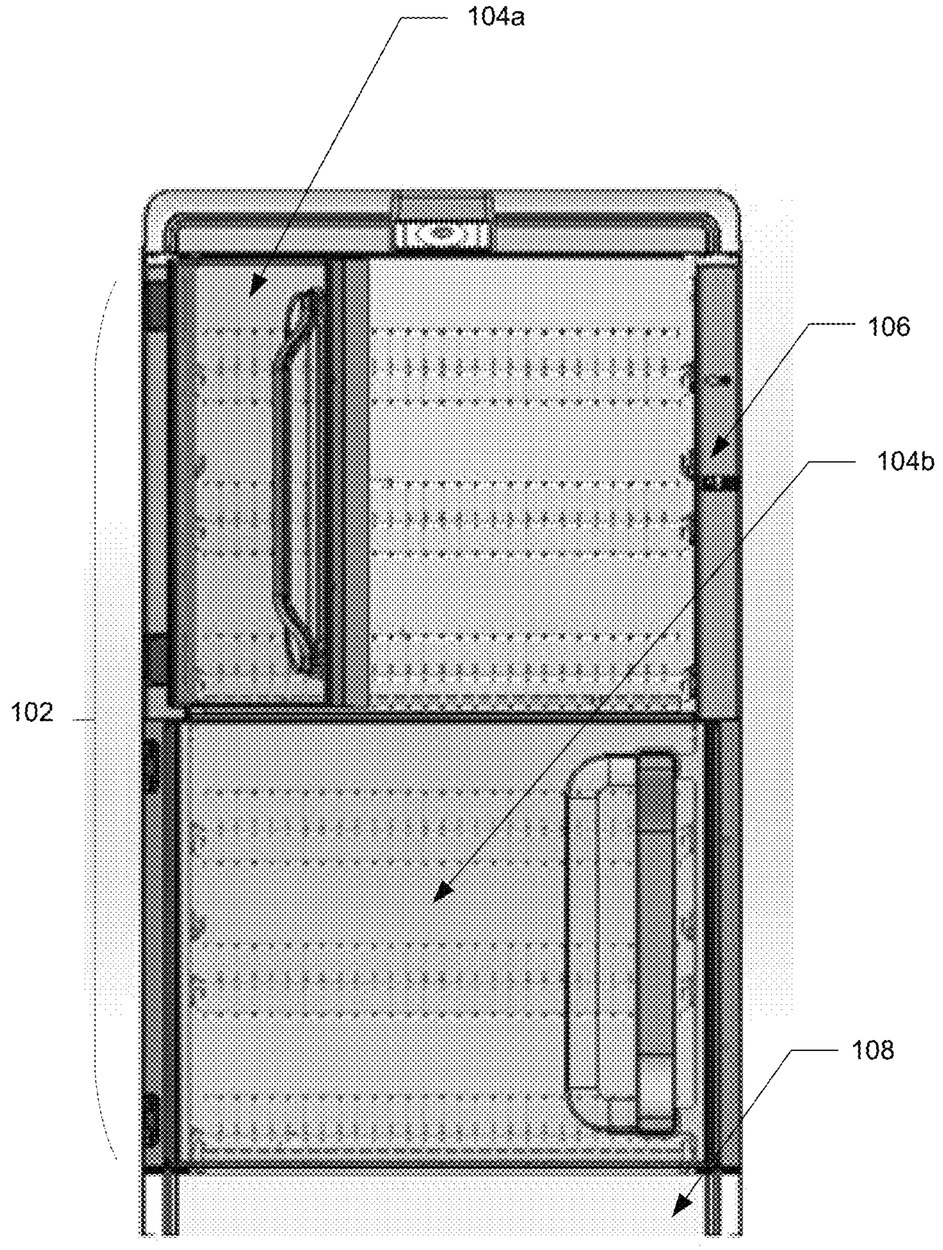
FIG. 1C depicts a planar view of an example of a dispensing cabinet, in accordance with some example embodiments.
Figure 1D:
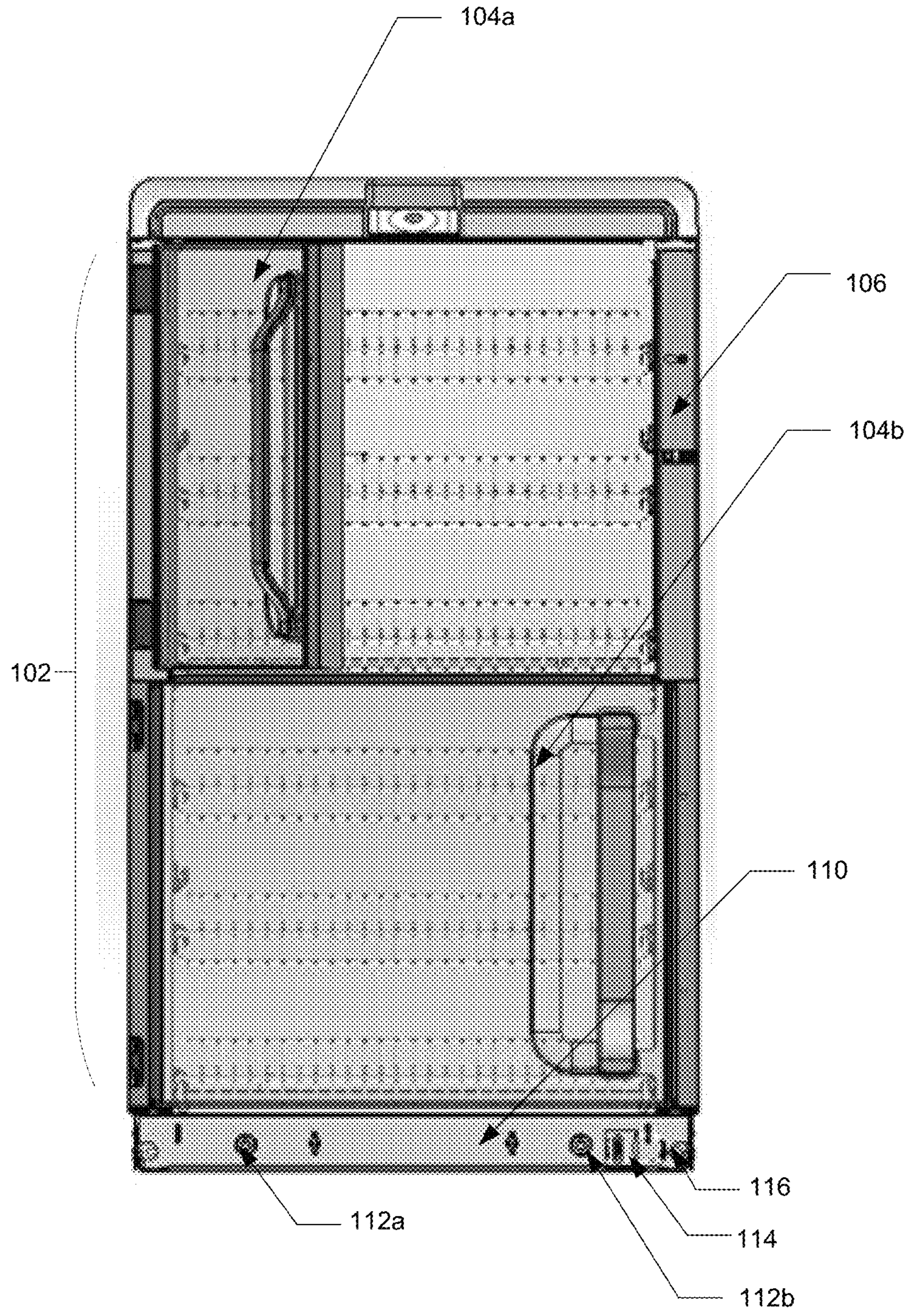
FIG. 1D depicts another planar view of an example of a dispensing cabinet, in accordance with some example embodiments.

Anomalous behavior, such as diversion, medical error, hazardous conduct, and protocol noncompliance, may occur at any point in time during the lifecycle of a medication including, for example, the shipping, receiving, stocking, dispensing, administration, and/or wasting of the medication. Prescription pain medications may be especially prone to diversion due to a lack of sufficient custodial oversight during, for instance, the shipping, receiving, stocking, dispensing, administration, and/or wasting of the prescription pain medication. The detection, investigation, and prevention of anomalous behavior may therefore require providing controlled access to prescription pain medication such that interactions with the prescription pain medication may be subject to various security measures such as authentication and documentation. For example, prescription pain medication may be stored in a dispensing cabinet, which may be inaccessible to a clinician without verifying the clinician's identify and generating electronic records to document the interaction.

A conventional dispensing cabinet may be secured with an electromechanical lock without any alternate mechanisms for accessing the dispensing cabinet. Thus, when the electromechanical lock is rendered inoperable by an exceptional event such as a power outage, a software error, a mechanical failure, and/or the like, the contents of the dispensing cabinet, which may include critical life-saving medication, may become inaccessible. As such, in some example embodiments, the dispensing cabinet may include an emergency access feature configured to provide alternate access to the dispensing cabinet in the event the dispensing cabinet is inaccessible via the electromechanical lock. The emergency access feature may include a plunger that is secured in a disengaged position by a security panel. The security panel may be maintained in a locked position by one or more locks including, for example, a padlock, a barrel lock, and/or the like. In order to transition the plunger from the disengaged position to an engaged position, the security panel may be released by unlocking the one or more locks. In the engaged position, the plunger may interface with an emergency release lever including by shifting the emergency release lever upwards (or in a different direction). Doing so may release the one or more latches securing the door of the dispensing cabinet to provide access to the contents of the dispensing cabinet, for example, when the electromechanical lock securing the dispensing cabinet is rendered inoperable.

In some example embodiments, activation of the emergency access feature may trigger a sensor (or other switch) configured to provide a signal to a processor included in the dispensing cabinet to indicate the engagement of the emergency access feature. The processor may respond to the engagement of the emergency access feature by generating a log whose content may include, for example, a time, a date, and/or other information to facilitate review of the dispensing cabinet and its contents. In some implementations, the processor may include a visual indicator on a graphical user interface to indicate that the dispensing cabinet was accessed using the emergency access feature. This visual indicator may be provided as a light or visible element on a graphical user interface. In some implementations, the processor may adjust a dispensing workflow at the dispensing cabinet after detecting the engagement of the emergency access feature. For example, the processor may prohibit any additional dispenses from the dispensing cabinet until a reset code or authorization for dispensing is received. In another example, the processor may require a user to provide a count of items in one or more storage locations within the dispensing cabinet before permitting further access to the dispensing cabinet. Once the count is received, a subsequent request for an item in the counted location may be omitted. In this way, the stock of the dispensing cabinet after a potential emergency access may be confirmed and documented.

Figure 1E:
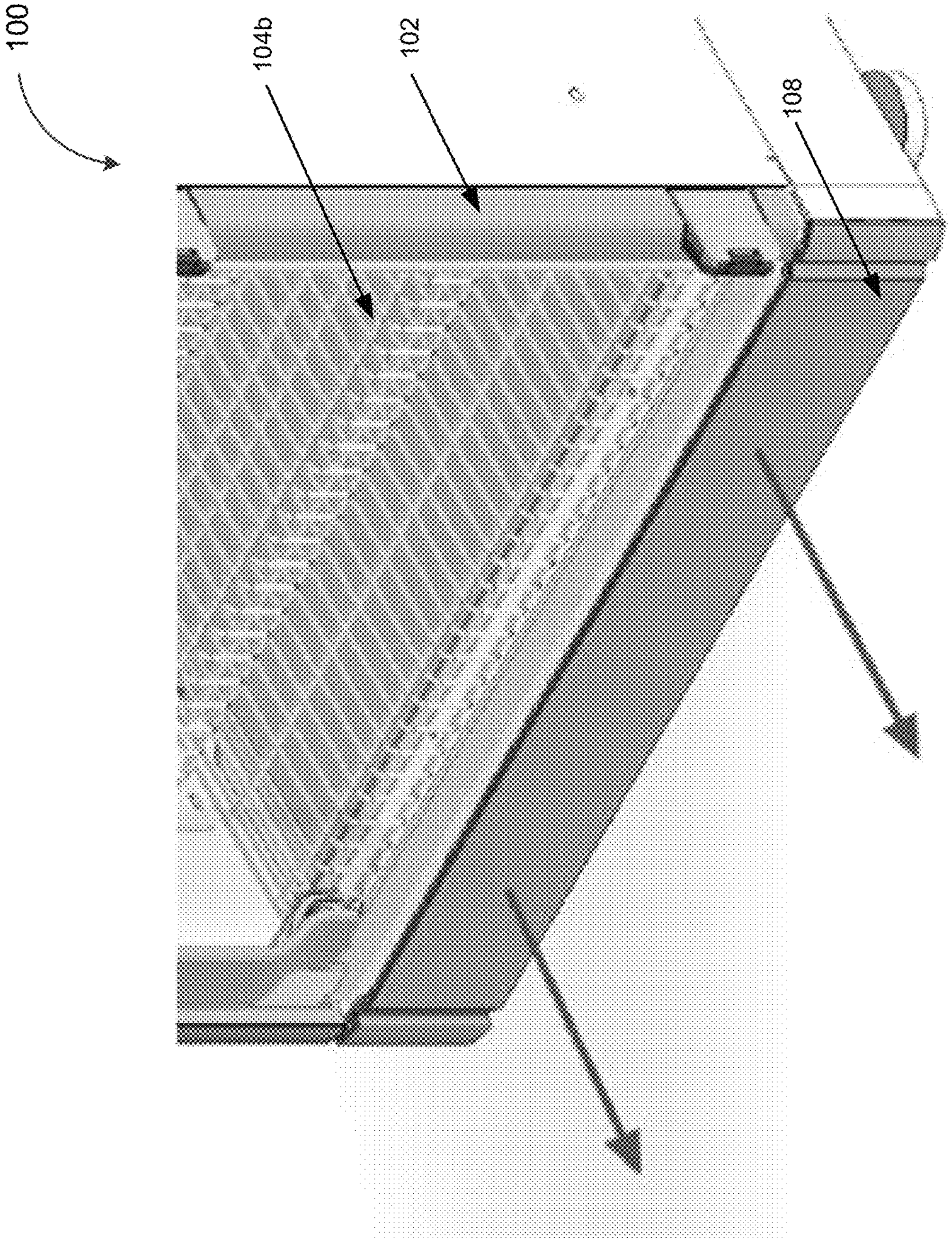
FIG. 1E depicts a close-up view of a bottom portion of an example of a dispensing cabinet, in accordance with some example embodiments.

FIGS. 1A-D depicts an example of a dispensing cabinet 100, in accordance with some example embodiments. A close-up view of the bottom portion of an example of the dispensing cabinet 100 is shown in FIG. 1E. Referring to FIGS. 1A-E, the dispensing cabinet 100 may include one or more doors including, for example, a first door 104*a*, a second door 104*b*, and/or the like. The contents of the dispensing cabinet 100 may be accessed, for example, by opening and closing the first door 104*a* and/or the second door 104*b*. As shown in FIGS. 1A-E, the first door 104*a* and the second door 104*b* may open and close by pivoting (or rotating) at least partially about a hinge 102, which may be disposed on either side of the dispensing cabinet 100. In the example of the dispensing cabinet shown in FIGS. 1A and 1C-D, the hinge 102 may be disposed on a left side of the dispensing cabinet 100. Alternatively, the hinge 102 may also be disposed on a right side of the dispensing cabinet 100, as shown in FIGS. 1B and 1E.

To prevent unauthorized and/or undocumented access to the contents of the dispensing cabinet 100, the first door 104*a* and the second door 104*b* may be secured using an electromechanical lock. For example, the electromechanical lock may remain locked to prevent the first door 104*a* and the second door 104*b* from being opened without verifying the identity of the clinician accessing the dispensing cabinet 100 and generating an electronic record of the interaction. However, the electromechanical lock may be rendered inoperable by one or more exceptional events such as power outages, software errors, mechanical failures, and/or the like. As such, in some example embodiments, the dispensing cabinet 100 may include an emergency release feature to provide an alternate mechanism for accessing the dispensing cabinet 100, for example, when the dispensing cabinet 100 is inaccessible via the electromechanical lock.

In some example embodiments, the emergency release feature may include a plunger 116 having a disengaged position and an engaged position. In the engaged position, the plunger 116 may interface with a lever 130 included in a U-channel assembly 106 disposed on an opposite side of the dispensing cabinet 100 as the hinge 102. For example, in the engaged position, the plunger 116 may shift the lever 130 upwards (or in a different direction) to release one or more latch assemblies 134 included in the U-channel assembly 106. Doing so may unlock the first door 104*a* and/or the second door 104*b* to provide access to the dispensing cabinet 100. Contrastingly, while the plunger 116 is in the disengaged position, the first door 104*a* and the second door 104*b* may remain locked. To prevent inadvertent and/or unauthorized engagement of the plunger 116, the emergency release feature of the dispensing cabinet 100 may further include a security panel 110 configured to maintain the plunger 116 in the disengaged position.

Referring again to FIGS. 1A-E, the dispensing cabinet 100 may include a skirt 108, which may be removed to expose the security panel 110. In the example of the dispensing cabinet 100 shown in FIGS. 1A-E, the security panel 110 may be maintained in a locked position by one or more locks including, for example, a padlock 104, a first barrel lock 112*a*, a second barrel lock 112*b*, and/or the like. While the security panel 110 is in the locked position, the plunger 116 may be visible through a cutout 117 in the security panel 110. However, the security panel 110 in the locked position may prevent the plunger 116 from being transitioned from the disengaged position to the engaged position. The security panel 110 may be released from the locked position and, in some cases, removed from the dispensing cabinet 100, before the plunger 116 may be transitioned from the disengaged position to the engaged position in which the plunger 116 may interface with the lever 130 to unlock the first door 104*a* and/or the second door 104*b*.

Figure 2A:
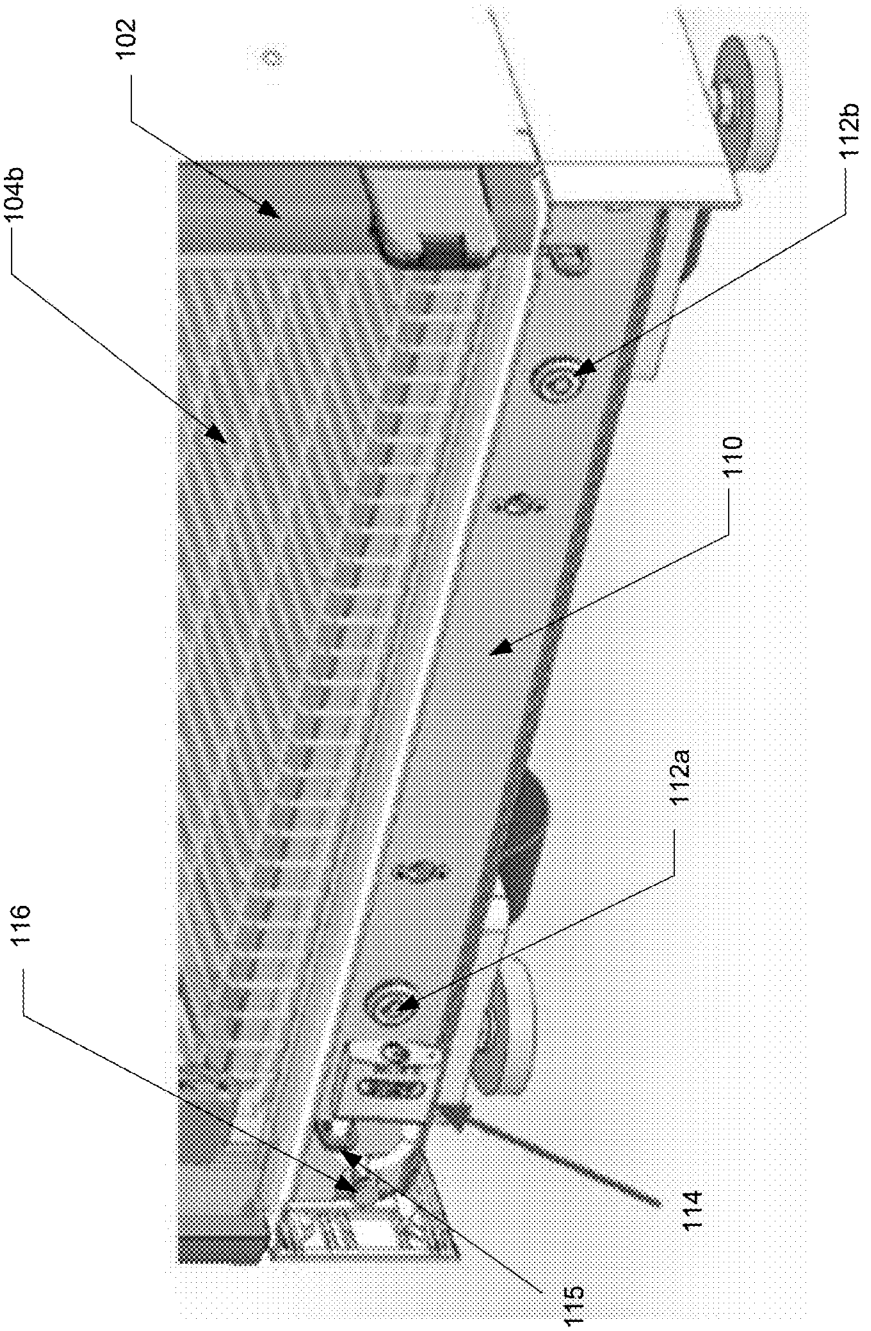
FIG. 2A depicts a close-up view of an example of a plunger secured in a disengaged position by a security panel in a dispensing cabinet, in accordance with some example embodiments, in accordance with some example embodiments.
Figure 2B:
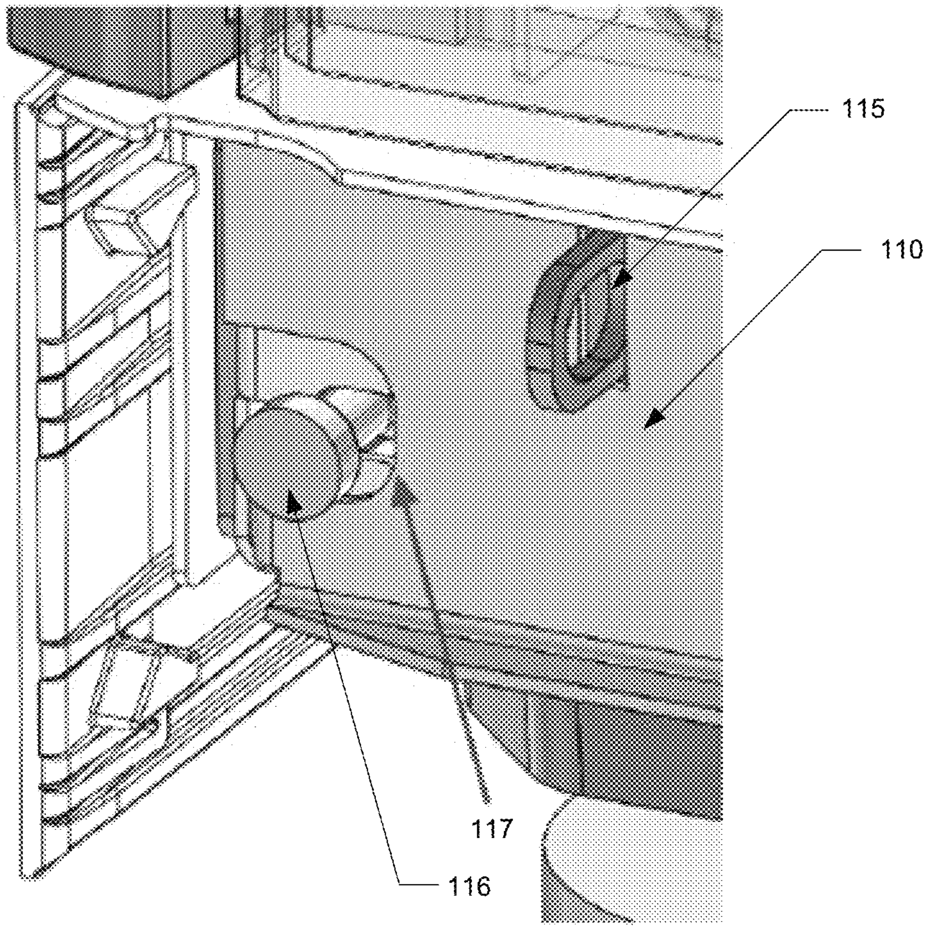
FIG. 2B depicts another close-up view of an example of a plunger secured in a disengaged position by a security panel in a dispensing cabinet, in accordance with some example embodiments.
Figure 2C:
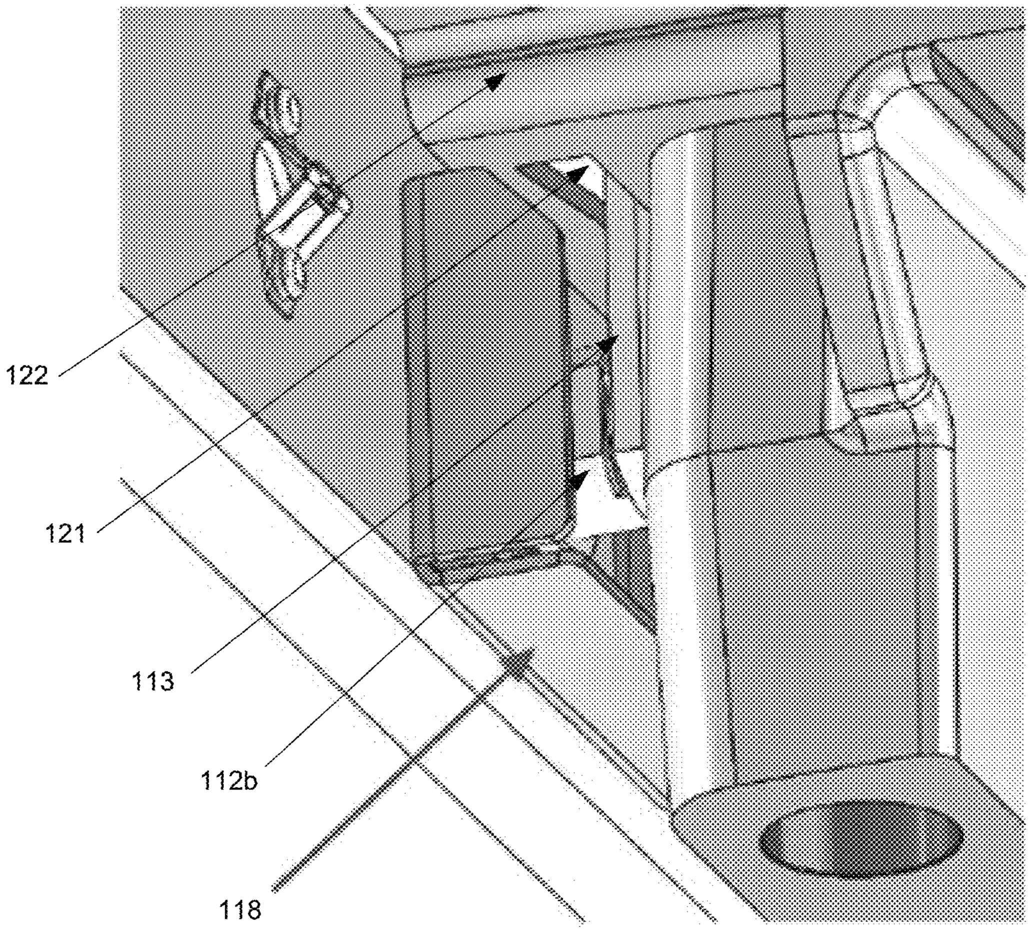
FIG. 2C depicts another close-up view of an example of a plunger secured in a disengaged position by a security panel in a dispensing cabinet, in accordance with some example embodiments.

FIGS. 2A-C depict various close-up views of the plunger 116 being secured in the disengaged position by the security panel 110. As shown in FIGS. 2A-C, in the locked position, the security panel 110 may be fastened to the dispensing cabinet 100 by the one or more locks including, for example, the padlock 104, the first barrel lock 112*a*, the second barrel lock 112*b*, and/or the like. For example, the security panel 110 may be maintained in the locked position by the first barrel lock 112*a* and the second barrel lock 112*b*, each of which having a barrel lock cam 113 configured to engage with a corresponding slot 121 in a sheet metal assembly 122 in the dispensing cabinet 100. Alternatively and/or additionally, the security panel 110 may be maintained in the locked position by the padlock 104 whose shackle (or shank) engages with a staple 115 in the dispensing cabinet 100.

Figure 3A:
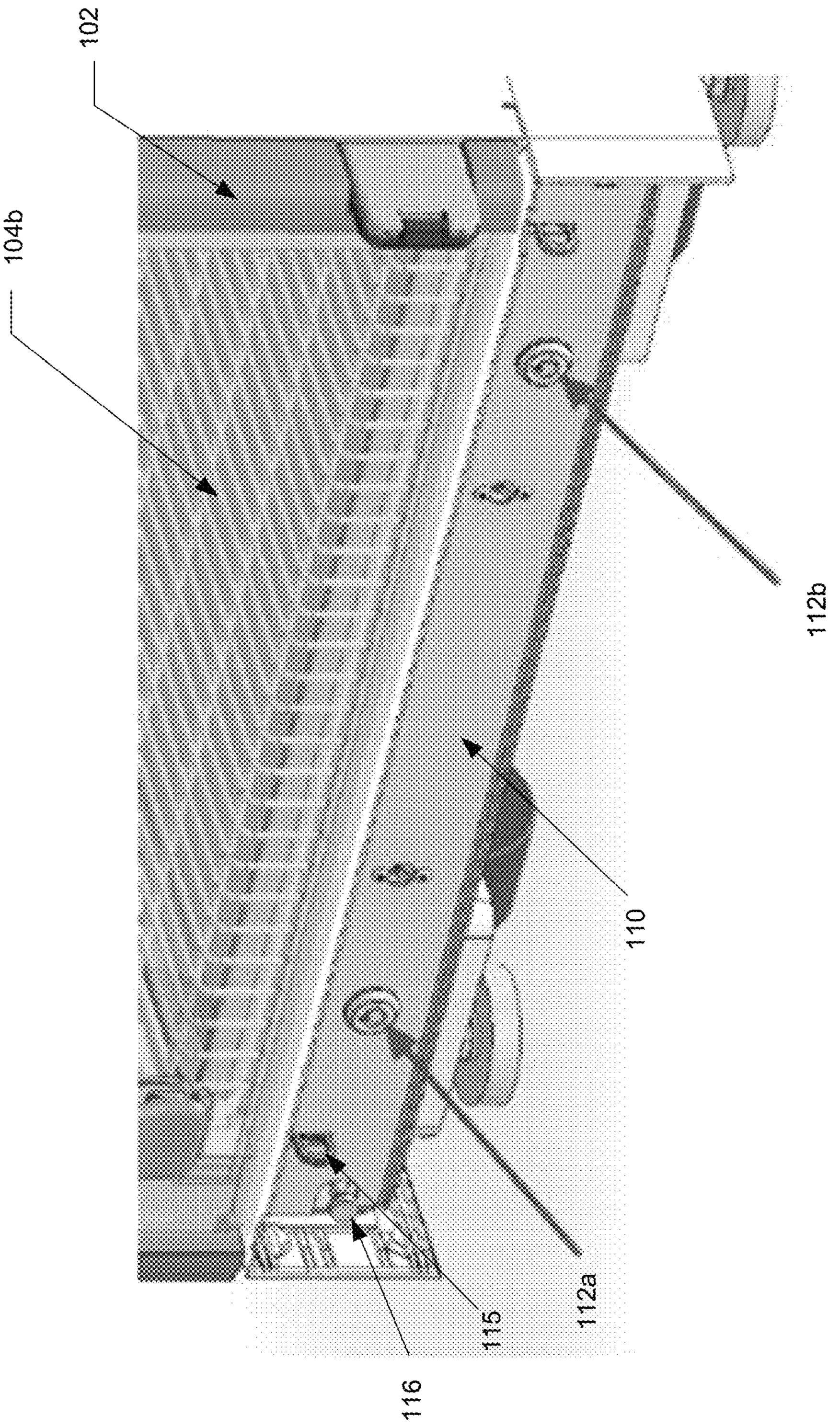
FIG. 3A depicts a close-up view of an example of a security panel being released from a dispensing cabinet, in accordance with some example embodiments.
Figure 3B:
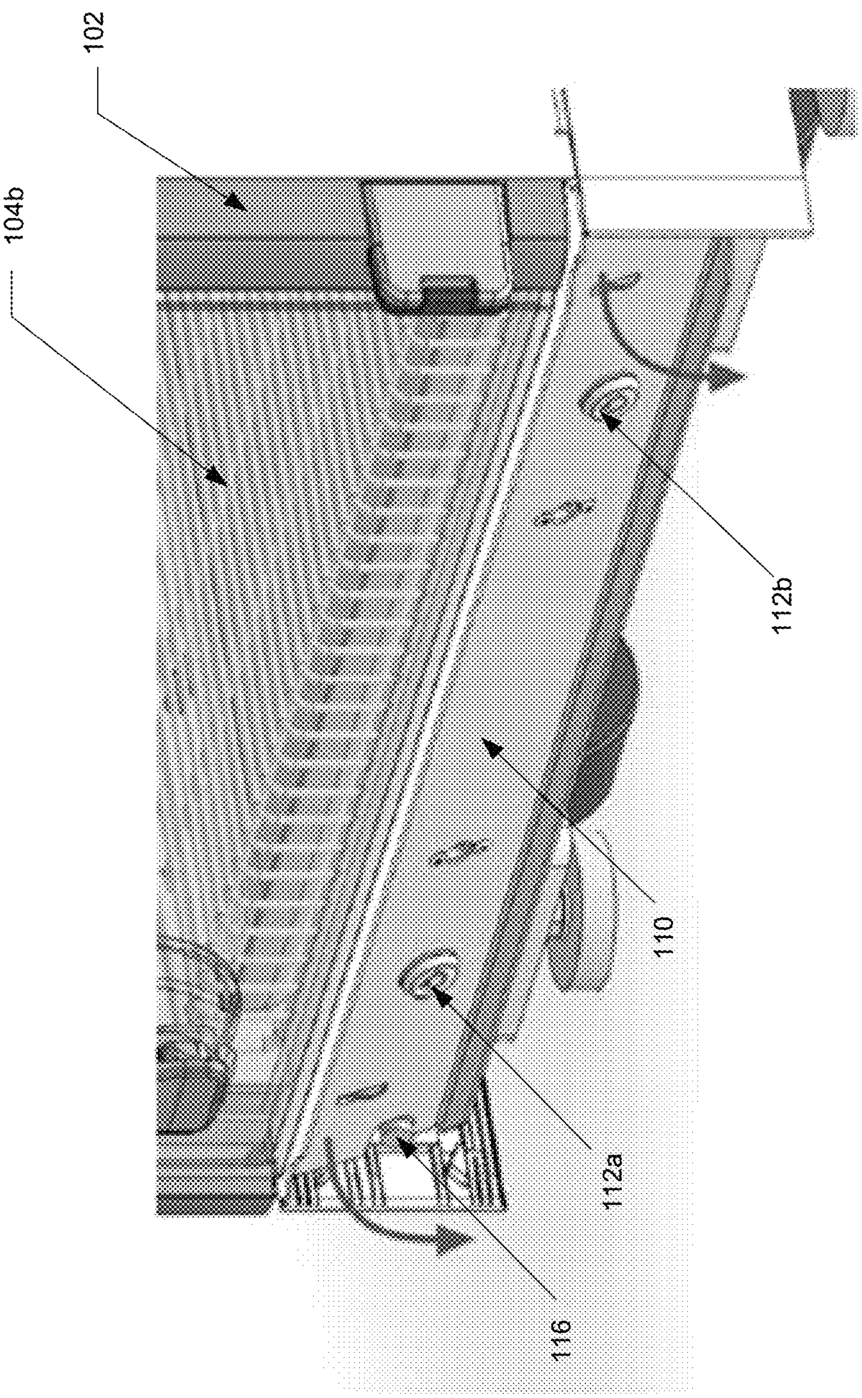
FIG. 3B depicts a close-up view of an example of a security panel being released from a dispensing cabinet, in accordance with some example embodiments.
Figure 3C:
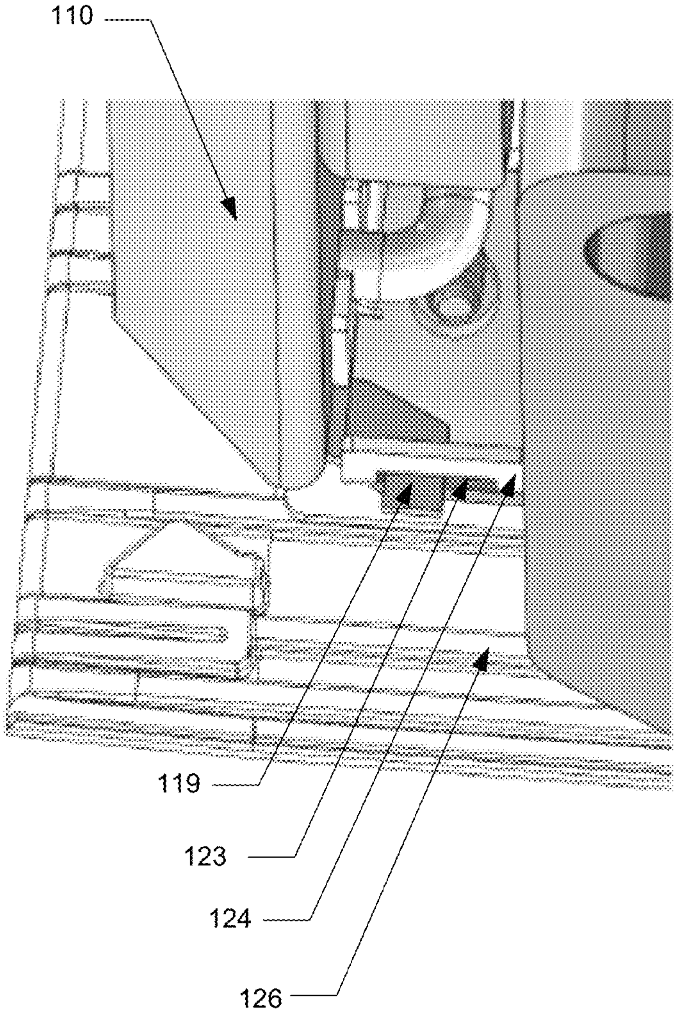
FIG. 3C depicts a close-up view of an example of a security panel being released from a dispensing cabinet, in accordance with some example embodiments.
Figure 3D:
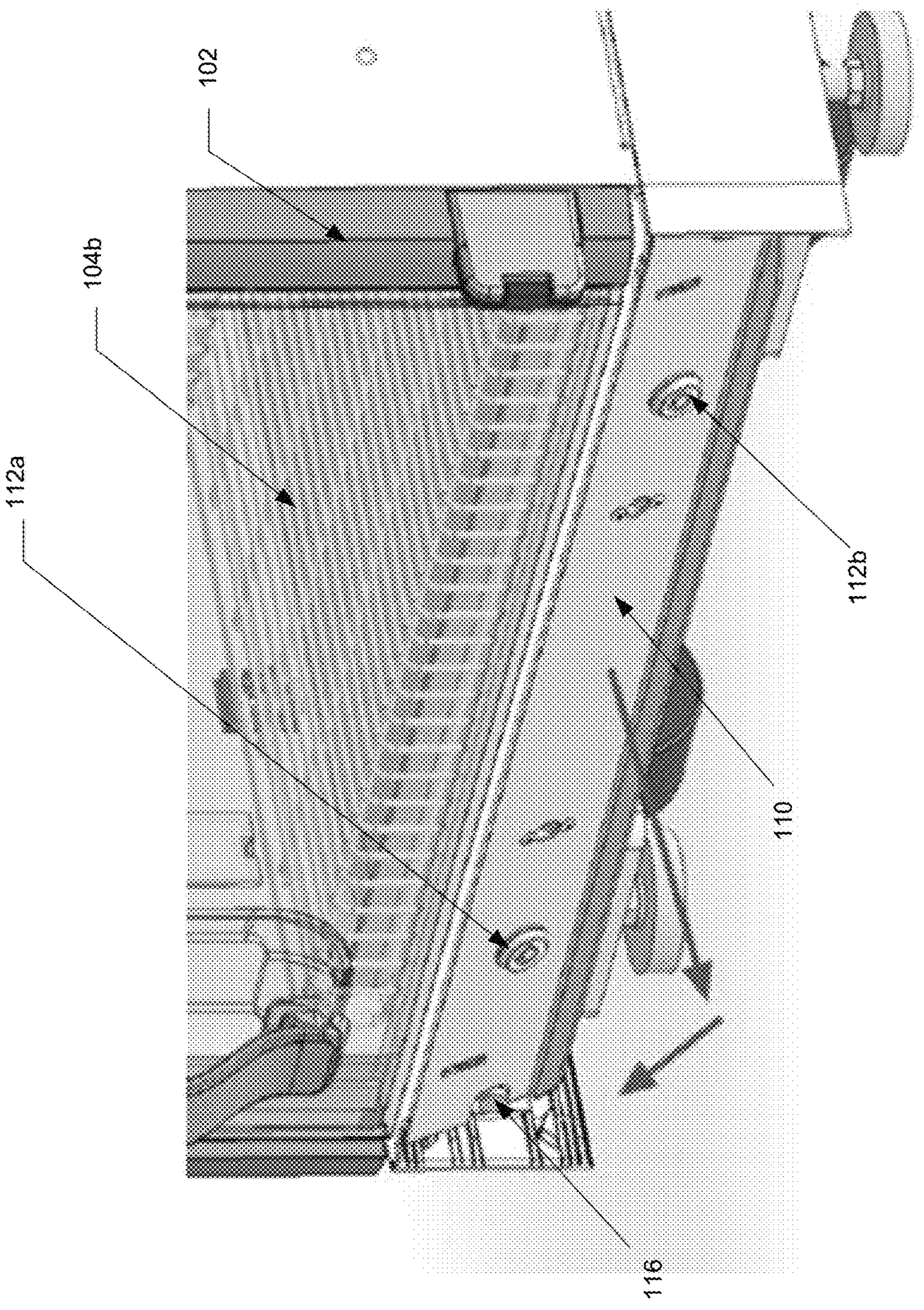
FIG. 3D depicts a close-up view of an example of a security panel being released from a dispensing cabinet, in accordance with some example embodiments.

FIGS. 3A-D depicts various close-up view of the security panel 110 being released from the dispensing cabinet 100 to expose the plunger 116, in accordance with some example embodiments. As shown in FIG. 3B, the security panel 110 may include one or more hooks 119, which are configured to engage with one or more corresponding slot features 123 in a side panel 126 of the dispensing cabinet 100. Thus, releasing the security panel 110 may include unlocking the padlock 104, the first barrel lock 112*a*, and the second barrel lock 112*b*. Moreover, once the padlock 104, the first barrel lock 112*a*, and the second barrel lock 112*b* are unlocked, the security panel 110 may be released and removed from the dispensing cabinet 100 by at least unhooking the one or more hooks 119 from the one or more corresponding slot features 123. This may be accomplished by turning the unlocked security panel 110 outwards and downwards before pulling the security panel 110 forwards and upwards. However, it should be appreciated that in some example embodiments, the security panel 110 may be released without being removed from the dispensing cabinet 100. For example, the security panel 110 may rotate (or pivot) about a hinge and thus remain affixed to the dispensing cabinet 100 while the security panel 110 is being turned downwards to expose the plunger 116.

Figure 3E:
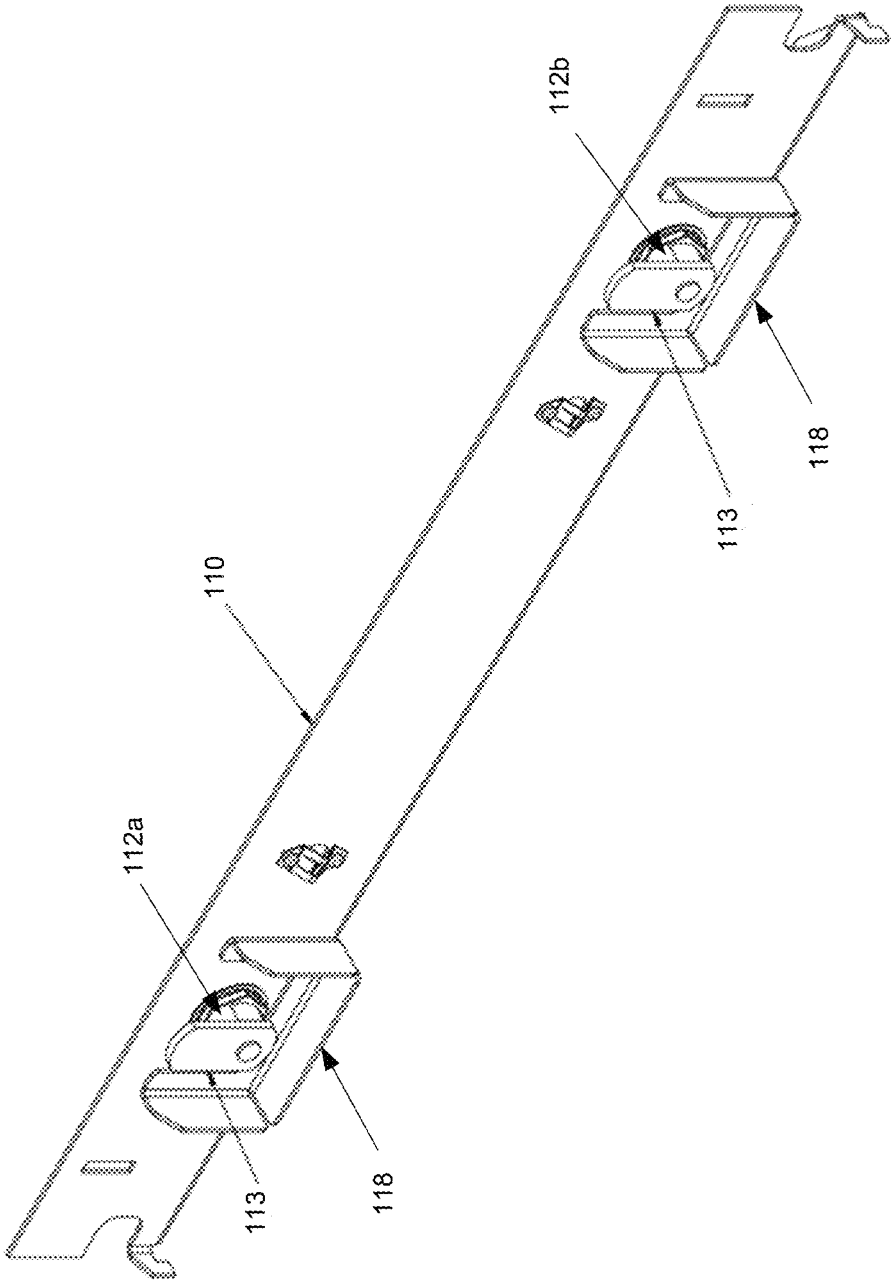
FIG. 3E depicts a perspective view of an example of a security panel, in accordance with some example embodiments.

FIG. 3E depicts a perspective view of a back of the security panel 110, in accordance with some example embodiments. As shown in FIGS. 2C and 3E, the security panel 110 may include one or more tamper guards 118 configured to thwart efforts to tamper with the first barrel lock 112*a* and the second barrel lock 122*b*. For example, as shown in FIG. 2C, the tamper guard 118 may include one or more pieces of material forming at least a partial enclosure around each of the first barrel lock 122*a* and the second barrel lock 122*b*. While the security panel 110 is in the locked position, the enclosure formed by the tamper guard 118 may prevent unauthorized access to the first barrel lock 122*a* and/or the second barrel lock 122*b* including, for example, attempts to remove of the barrel lock nut from the first barrel lock 122*a* and/or the second barrel lock 122*b* by inserting a wrench (or another tool) behind the security panel 110.

Figure 4A:
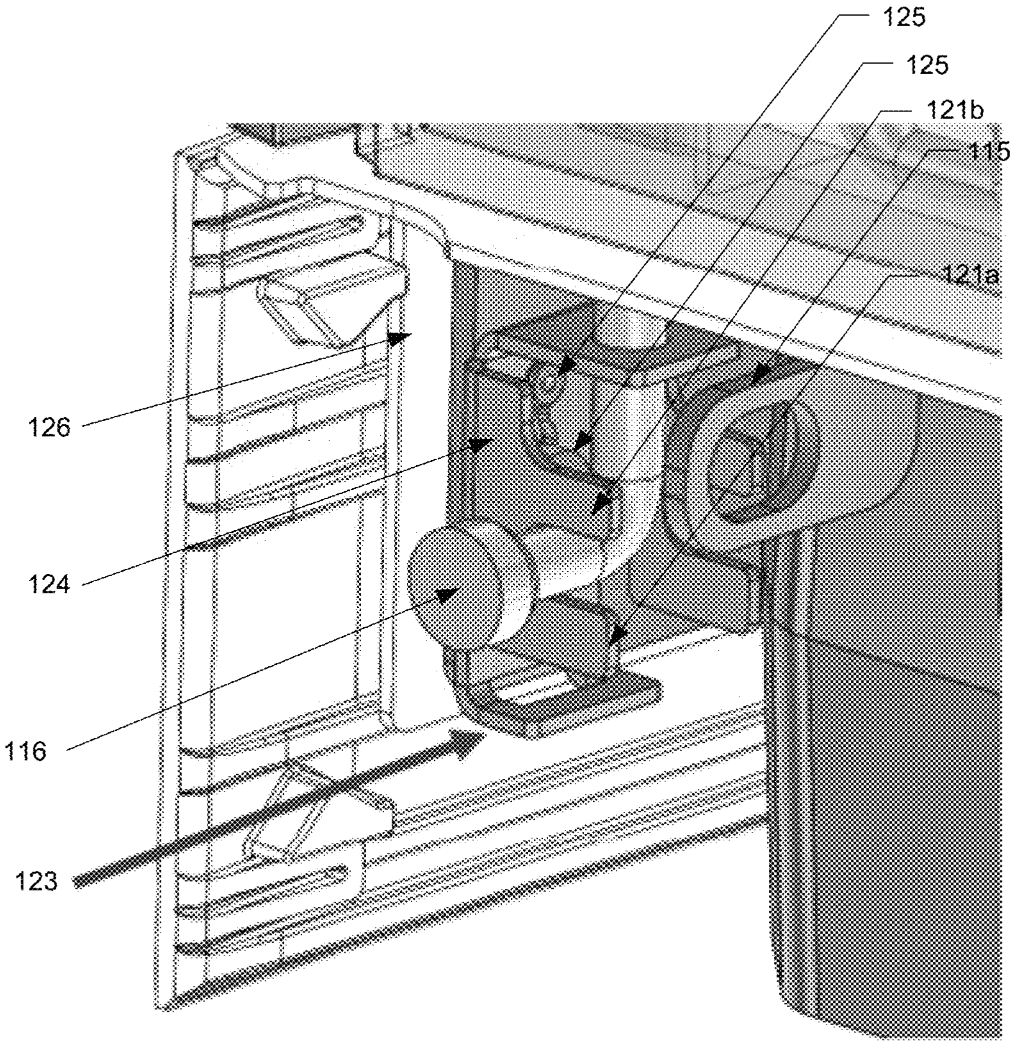
FIG. 4A depicts a close-up view of an example of a plunger in a disengaged position, in accordance with some example embodiments.
Figure 4B:
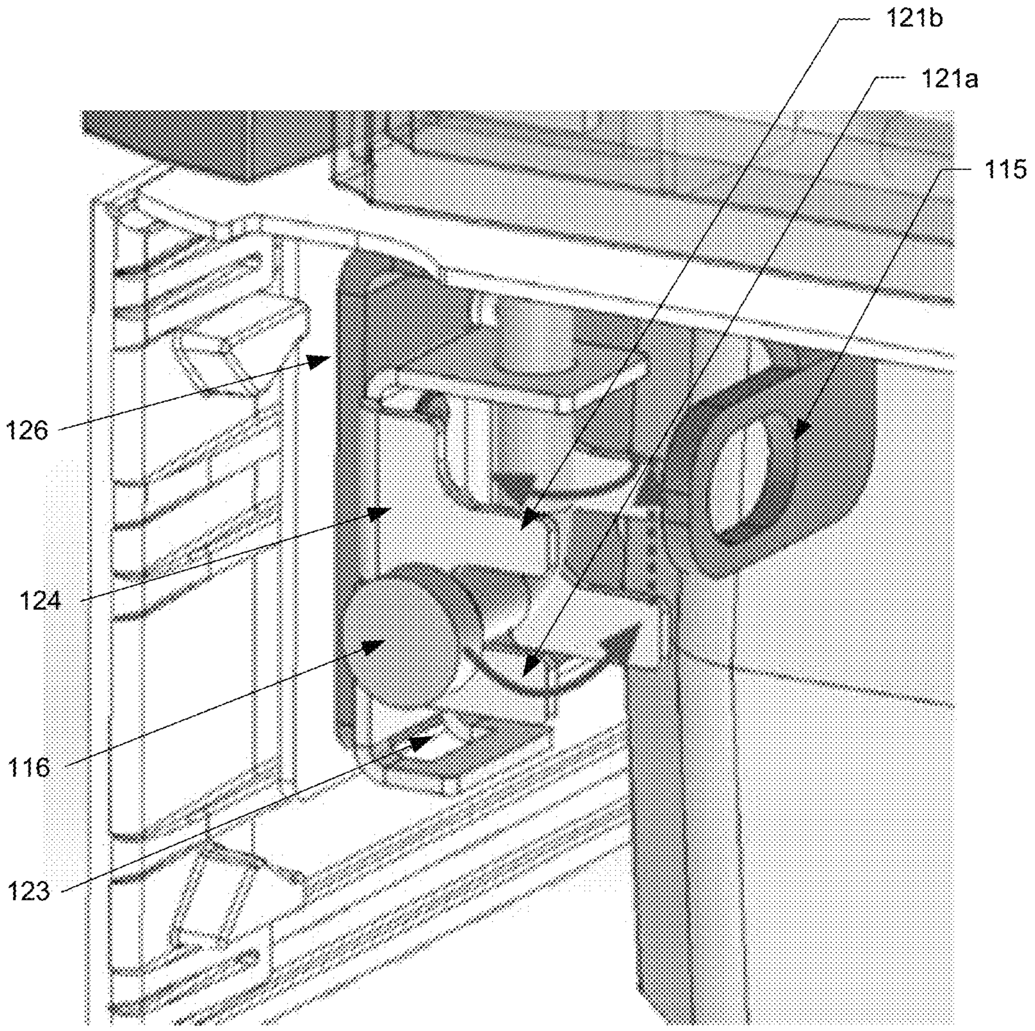
FIG. 4B depicts a close-up view of an example of a plunger being transitioned from a disengaged position to an engaged position, in accordance with some example embodiments.

In some example embodiments, releasing the security panel 110 may expose the plunger 116 such that the plunger 116 may be transitioned from the disengaged position to the engaged position. As shown in FIGS. 4A-B, the plunger 116 may interface with a bracket 124 that is affixed to the side panel 126 of the dispensing cabinet 100 by one or more fasteners including, for example, a fastener 125, a fastener assembly 135, and/or the like. The bracket 124 may include one or more fingers (or other projections) configured to support the plunger 116 in the disengaged position and in the engaged position. For example, in the example shown in FIGS. 4A-B, the bracket 124 may include a first finger 121*a* configured to support the plunger 116 in the disengaged position and a second finger 121*b* configured to support the plunger 116 in the engaged position. Moreover, in the example shown in FIGS. 4A-B, the one or more slot features 123 engaging the one or more hooks 119 in the security panel 110 may be part of the bracket 124.

Figure 4C:
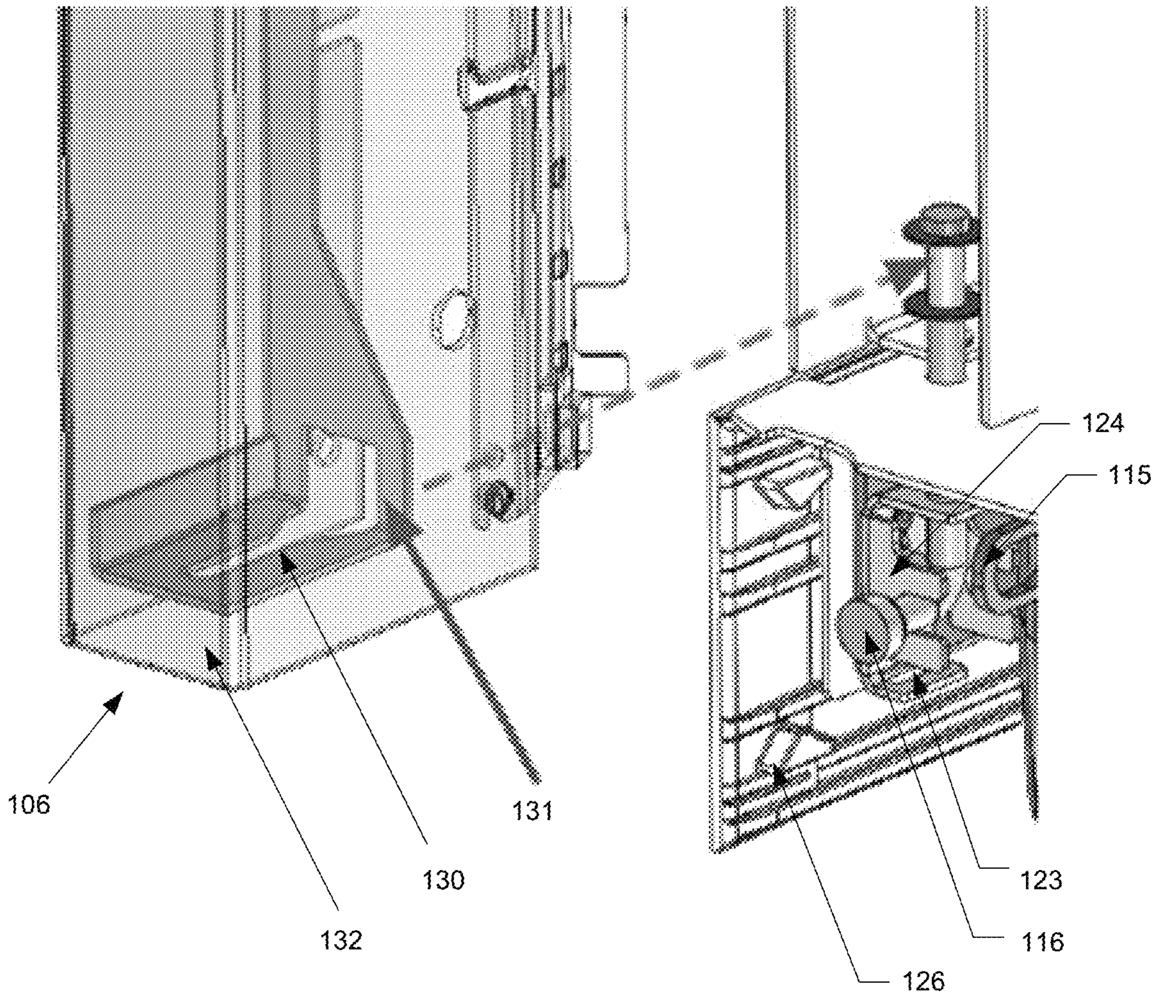
FIG. 4C depicts an exploded view of an example of a mechanical interface between a plunger and a U-channel assembly, in accordance with some example embodiments.

Referring again to FIGS. 4A-B, releasing (and/or removing) the security panel 110 may provide sufficient space to accommodate the plunger 116 as the plunger 116 transitions from the disengaged position to the engaged position. An example of this transition is depicted in FIG. 4B in which the plunger 116 resting on the first finger 121*a* of the bracket 124 while in the disengaged position is rotated sideways to achieve the clearance needed to be shifted upwards to the engaged position before being rotated in an opposite direction to remain in the engaged position while resting on the second finger 121*b* of the bracket 124. As shown in FIG. 4C, the plunger 116 in the engaged position may engage with the lever 130, which is disposed at least partially inside a U-channel 132 to form the U-channel assembly 106. A cutout 131 in the U-channel 132 may enable the U-channel assembly 106 to be installed and removed without removing the plunger 116 and the bracket 124. As noted, the plunger 116 may engaged with the lever 130 by shifting the lever 130 upwards (or in a different direction) to unlock the first door 104*a* and/or the second door 104*b* of the dispensing cabinet 100 by releasing the one or more latch assemblies 134 included in the U-channel assembly 106.

Figure 5A:
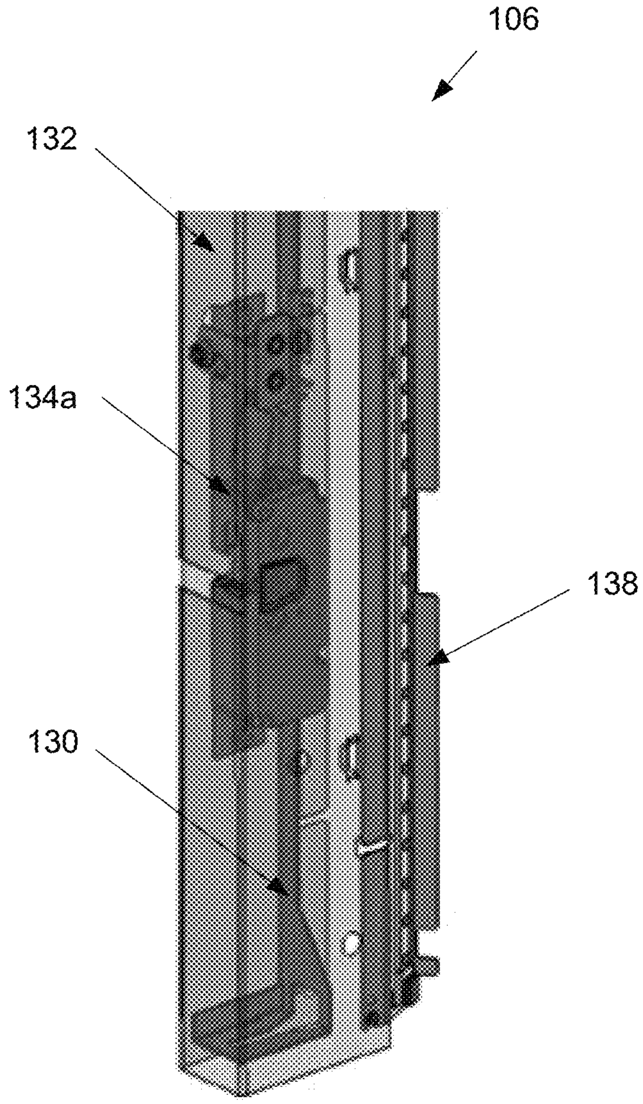
FIG. 5A depicts a perspective view of a portion of an example of a U-channel assembly, in accordance with some example embodiments.
Figure 5B:
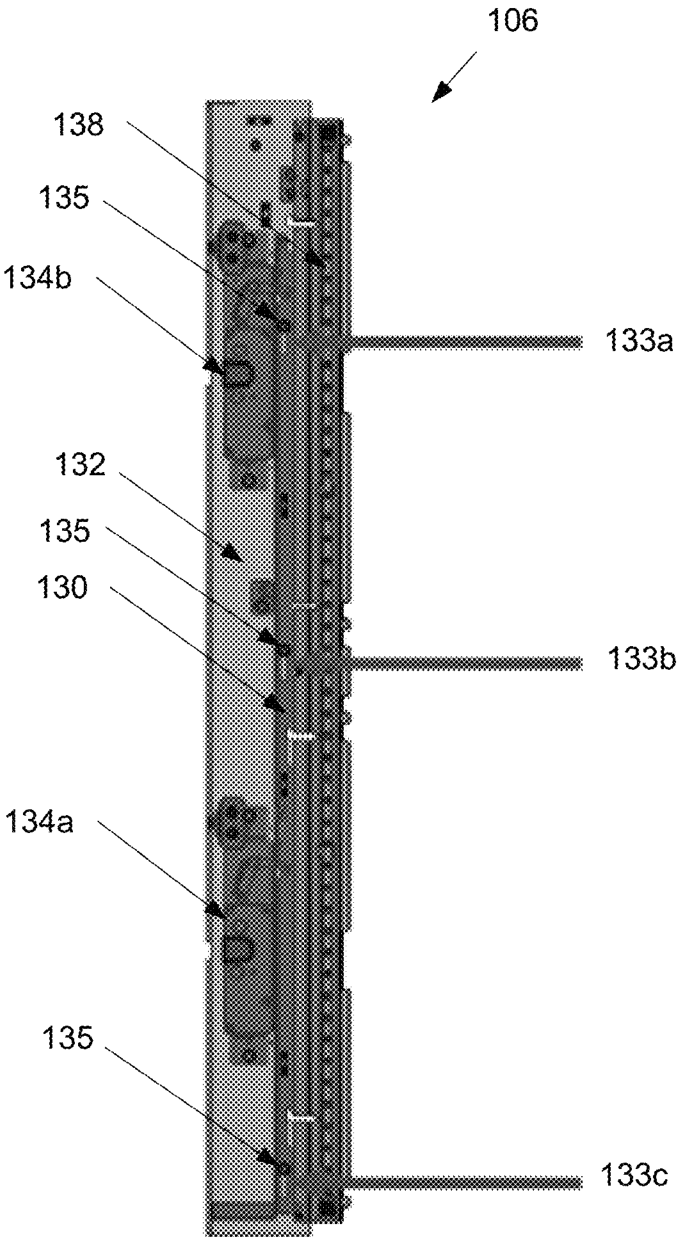
FIG. 5B depicts a planar view of an example of a U-channel assembly, in accordance with some example embodiments.

FIGS. 5A-B and 6A-C depict various views of an example of the U-channel assembly 106, in accordance with some example embodiments. As shown in FIGS. 5A-B, the U-channel assembly 106 may include the lever 130, which may interface with a first latch assembly 134*a* and a second latch assembly 134*b* to unlock the first door 104*a* and/or the second door 104*b* and provide access to the dispensing cabinet 100. In the example shown in FIGS. 5A-B and 6A-C, the lever 130 may include one or more slots including, for example, a first slot 133*a*, a second slot 133*b*, and a third slot 133*c*. The lever 130 may be secured to the U-channel 132 by one or more corresponding fastener assemblies 135. The fastener assembly 135 may be configured to provide at least some mobility to the lever 130, for example, by allowing the lever 130 to be shifted upwards (or in a different direction) along a length of the first slot 133*a*, the second slot 133*b*, and the third slot 133*c*.

Figure 5C:
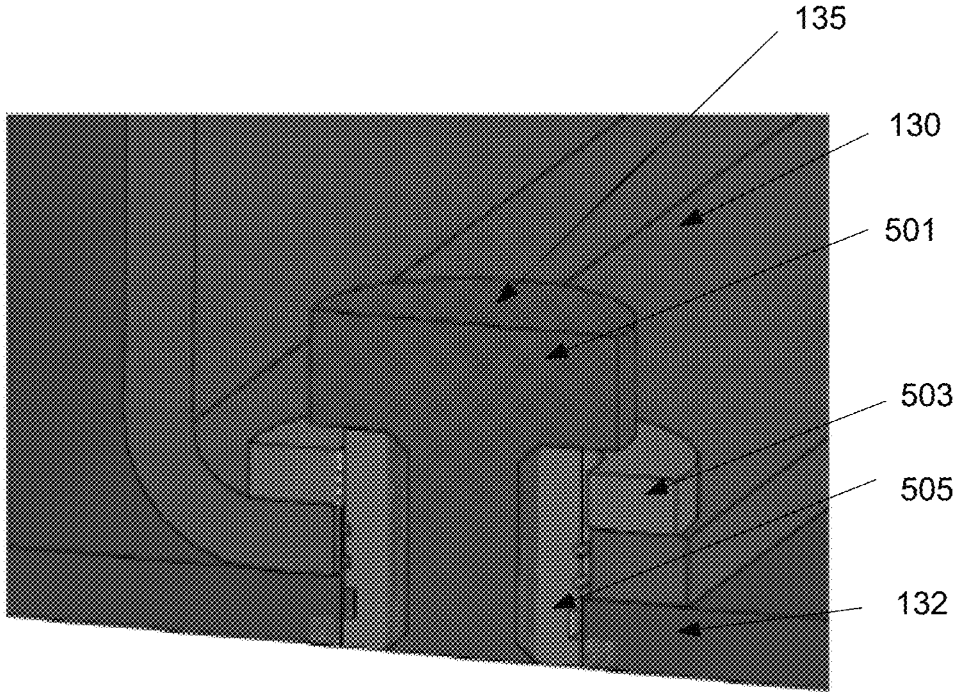
FIG. 5C depicts a cross-sectional perspective view of an example of a fastener securing an emergency release long lever in a U-channel assembly, in accordance with some example embodiments.
Figure 5D:
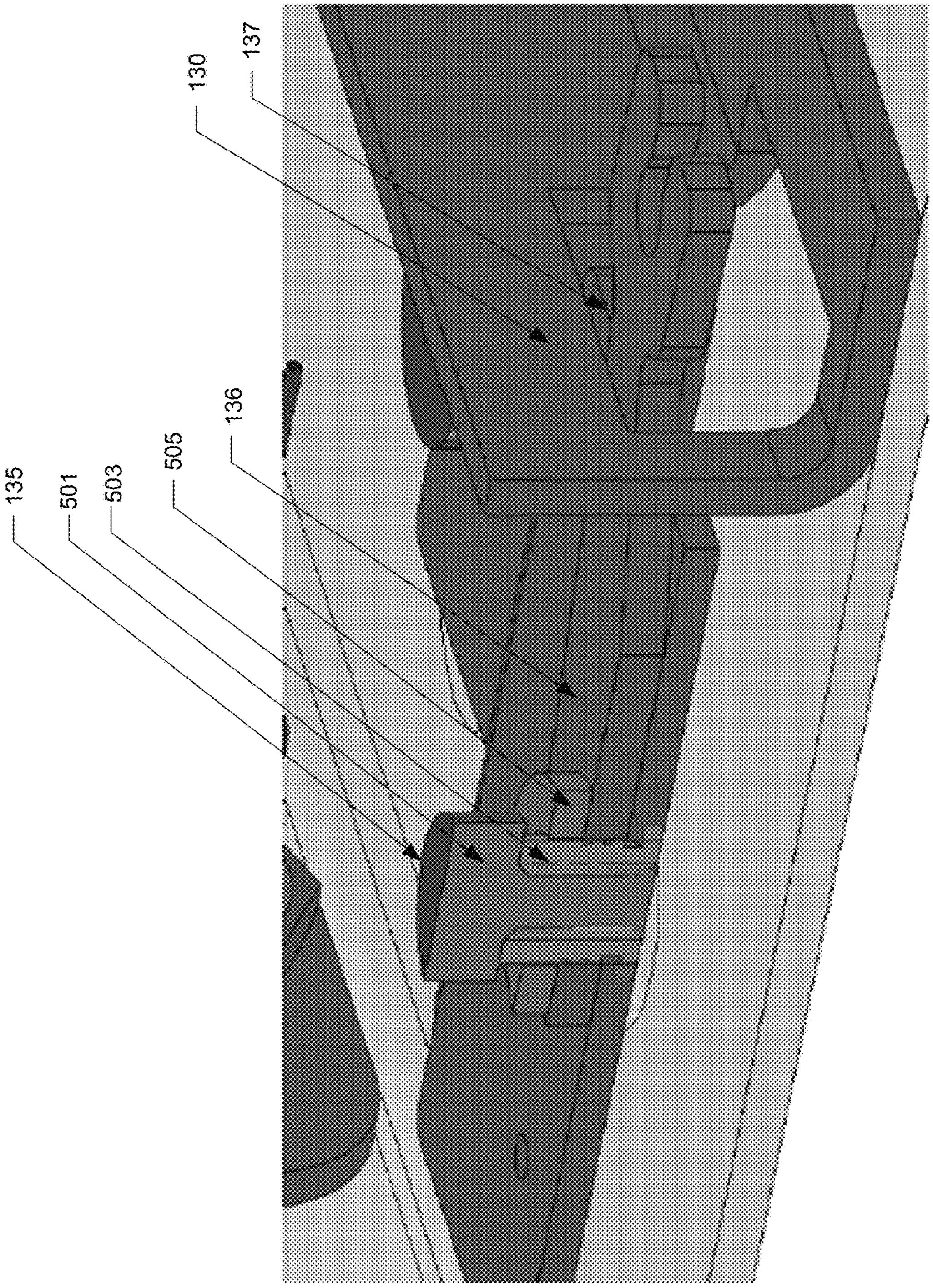
FIG. 5D depicts a cross-sectional perspective view of an example of a fastener securing a cam bracket in a latch assembly, in accordance with some example embodiments.

Examples of the fastener assembly 135 are shown in FIGS. 5C-D. In the examples shown in FIGS. 5C-D, the fastener assembly 135 may include a standoff 501, a washer 503, and a fastener 505. In some example embodiments, the standoff 501 may be a double-ended threaded fastener configured to provide a space that allows the lever 130 to shift upwards (or in a different direction). As shown in FIG. 5D, the same fastener assembly 135 may also be used to secure the cam bracket 136 included in the first latch assembly 134*a* and/or the second latch assembly 134*b*. For example, the standoff 501 may provide a space that allows the cam bracket 136 is able to rotate (or pivot). The first latch assembly 134*a* and the second latch assembly 134*b* may be released to unlock the first door 104*a* and/or the second door 104*b* by the rotating (or pivoting) of the cam bracket 136 in each of the first latch assembly 134*a* and the second latch assembly 134*b*.

Figure 6A:
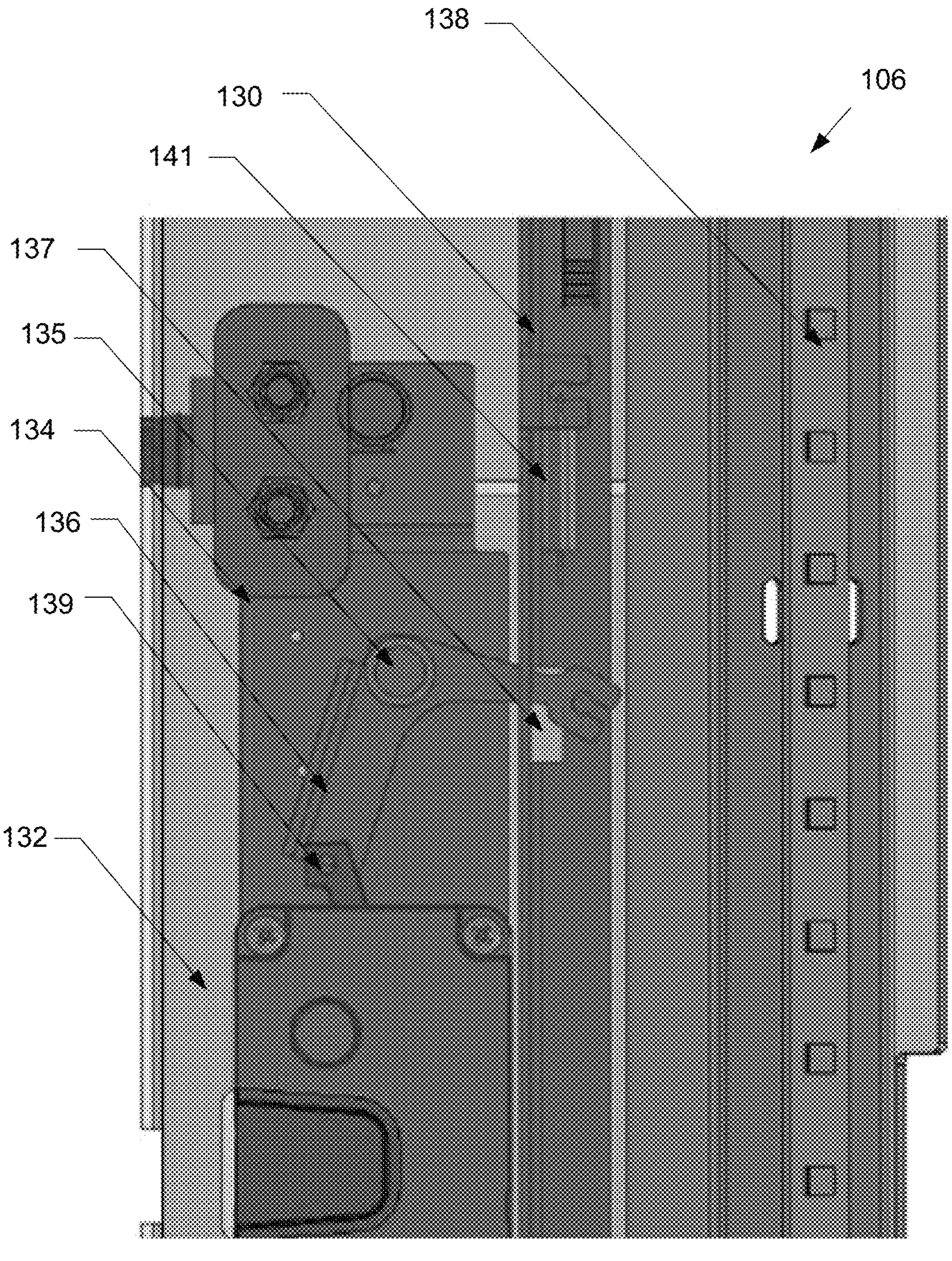
FIG. 6A depicts a close-up view of an example of a latch assembly being released to provide emergency access to a dispensing cabinet, in accordance with some example embodiments.
Figure 6B:
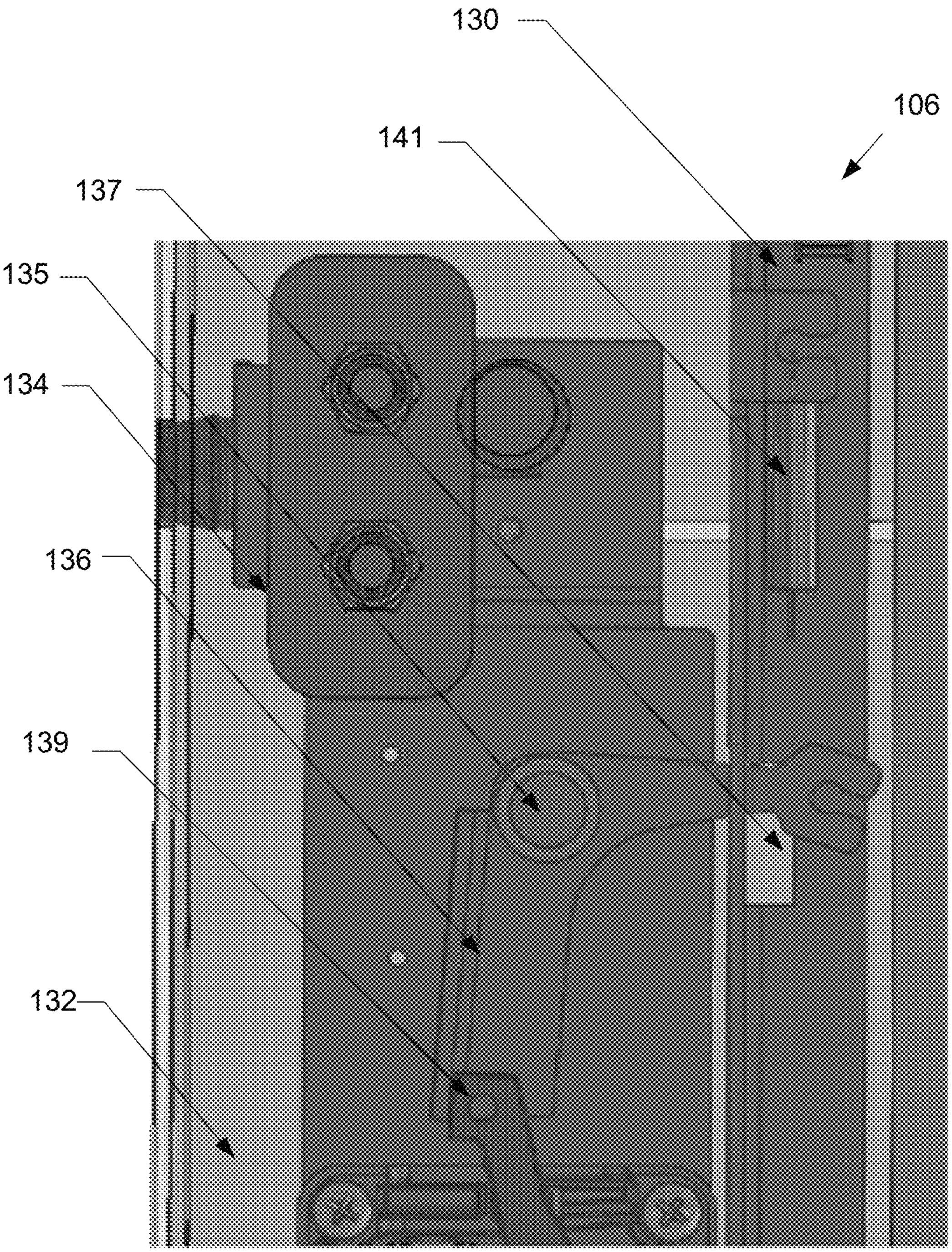
FIG. 6B depicts another close-up view of an example of a latch assembly being released to provide emergency access to a dispensing cabinet, in accordance with some example embodiments.
Figure 6C:
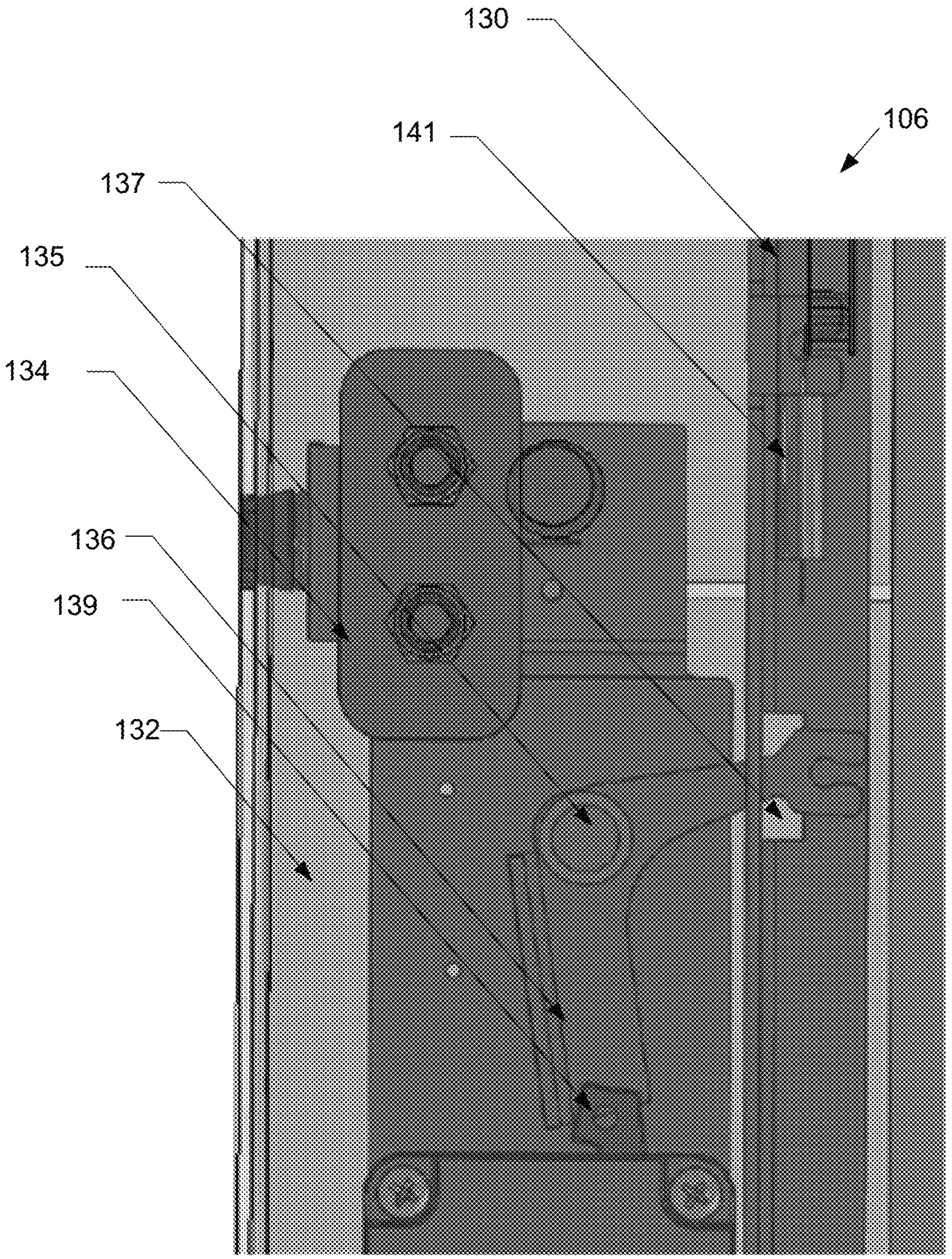
FIG. 6C depicts another close-up view of an example of a latch assembly being released to provide emergency access to a dispensing cabinet, in accordance with some example embodiments.

To further illustrate, FIGS. 6A-C depict various close-up views of an example of the latch assembly 134 being released to provide emergency access to the dispensing cabinet 100. In FIG. 6A, the latch assembly 134 is in a locked position in which tension from a spring 141 joining the cam bracket 136 to the lever 130 keeps the cam bracket 136 inside a slot 137 in the lever 130 and in contact with a top of the slot 137. For example, the eyelet at one end of the spring 141 may be attached to one or more fingers in the lever 130 while the eyelet at the opposite end of the spring 141 may be attached to one or more fingers in the cam bracket 136. As shown in FIG. 6B, upward motion of the lever 130, which may be actuated by an upward shift of the plunger 116, may cause a lever 139 to rotate. The rotation of the lever 139 may cause the cam bracket 136 to maintain its contact with the top of the slot 137 in the lever 130. As shown in FIG. 6C, the contact between the cam bracket 136 and the top of the slot 137 in the lever 130 may be maintained while the lever 130 continues its upward shift until the lever 139 hits a limit within the latch assembly 134. The cam bracket 136 may be unable to rotate beyond this limit imposed by the lever 130. At that point, FIG. 6C shows that the cam bracket 136 may stop its rotation and separate from the top of the slot 137, thus releasing the latch assembly 134 to unlock the first door 104*a* and/or the second door 104*b*. That is, the latch assembly 134 may be released once the cam bracket 136 is rotated to the limit imposed by the lever 139. It should be appreciated that to minimize tolerance issues, the lever 130 may be configured to continue its upward motion after the cam bracket 136 has stopped its rotation. That the lever 130 is configured to permit at least some degree of over-travel may ensure that both the first latch assembly 134*a* and the second latch assembly 134*b* are successfully released by transitioning the plunger 116 from the disengaged position to the engaged position, even if discrepancies may exist in the various components of the U-channel assembly 106.

In some example embodiments, the emergency release feature of the dispensing cabinet 100 may be configured to support a routine emergency access procedure and a non-routine emergency access procedure. With the routine emergency access procedure, the first door 104*a* and the second door 104*b* of the dispensing cabinet 100 may be unlocked by transitioning the plunger 116 from the disengaged position (e.g., resting on the first finger 121*a* of the bracket 124) to the engaged position (e.g., resting on the second finger 121*b* of the bracket 124). As noted, transitioning the plunger 116 from the disengaged position to the engaged position may shift the lever 130 in the U-channel assembly 106 upwards to release the one or more latch assemblies 134 locking the first door 104*a* and the second door 104*b*. By contrast, with the non-routine emergency access procedure, additional operations may be performed in order to unlock the first door 104*a* and the second door 104*b* of the dispensing cabinet 100. The non-routine emergency access procedure may be deployed due to a variety of exceptional circumstances including certain hardware malfunctions within the U-channel assembly 106.

Figure 7A:
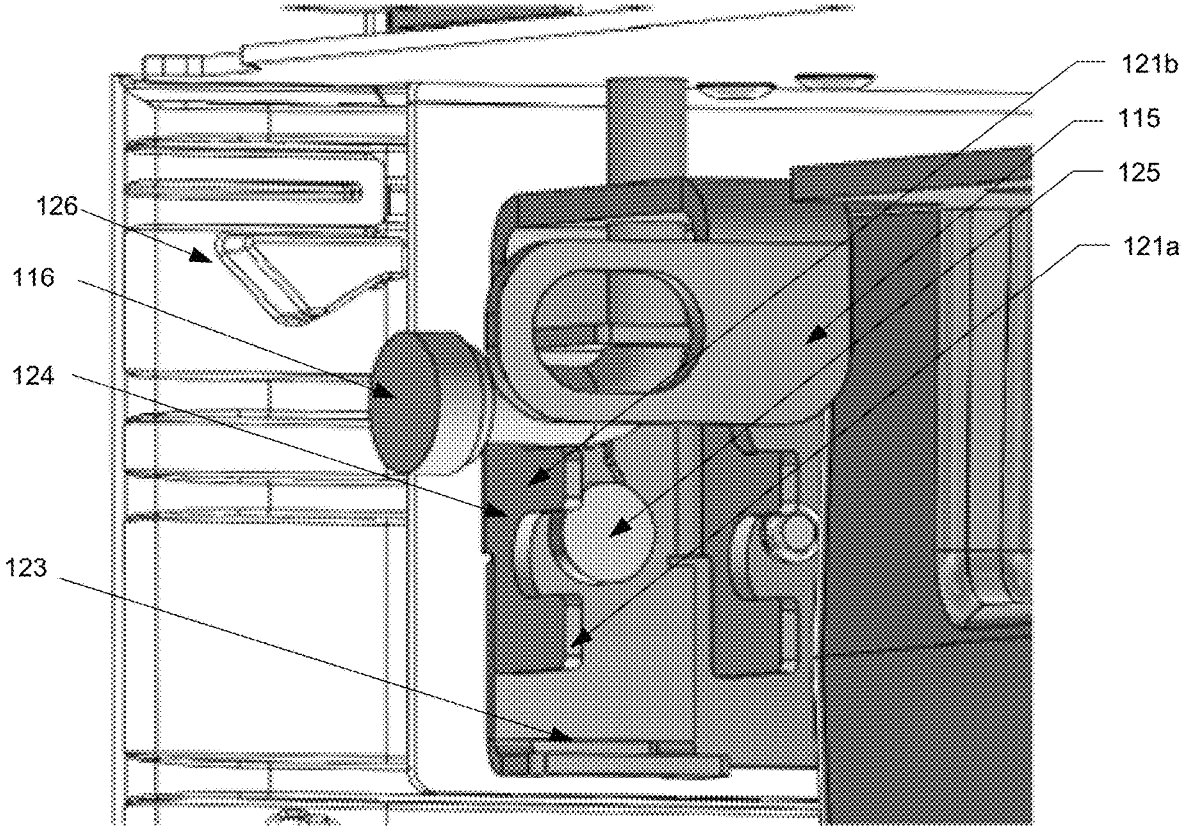
FIG. 7A depicts a close-up view of a plunger undergoing an example of a non-routine emergency access procedure, in accordance with some example embodiments.
Figure 7B:
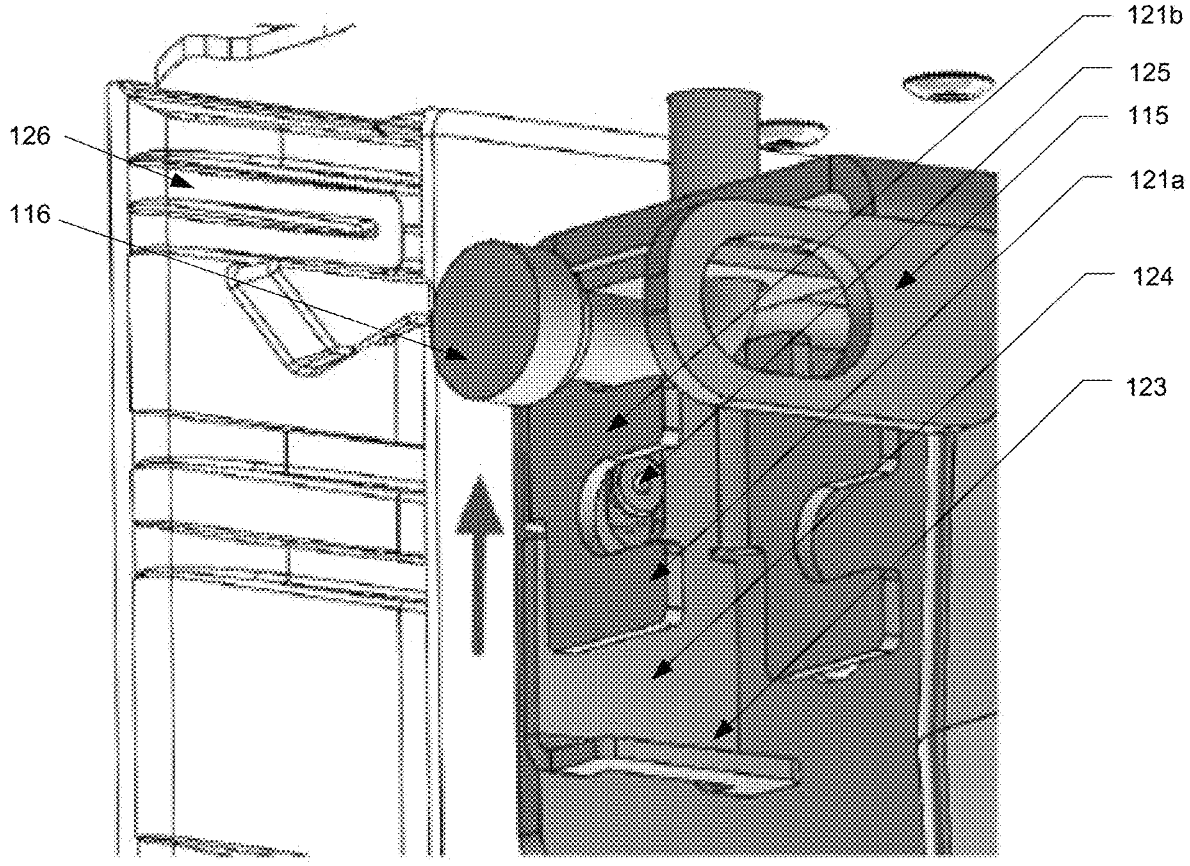
FIG. 7B depicts another close-up view of a plunger undergoing an example of a non-routine emergency access procedure, in accordance with some example embodiments.
Figure 7C:
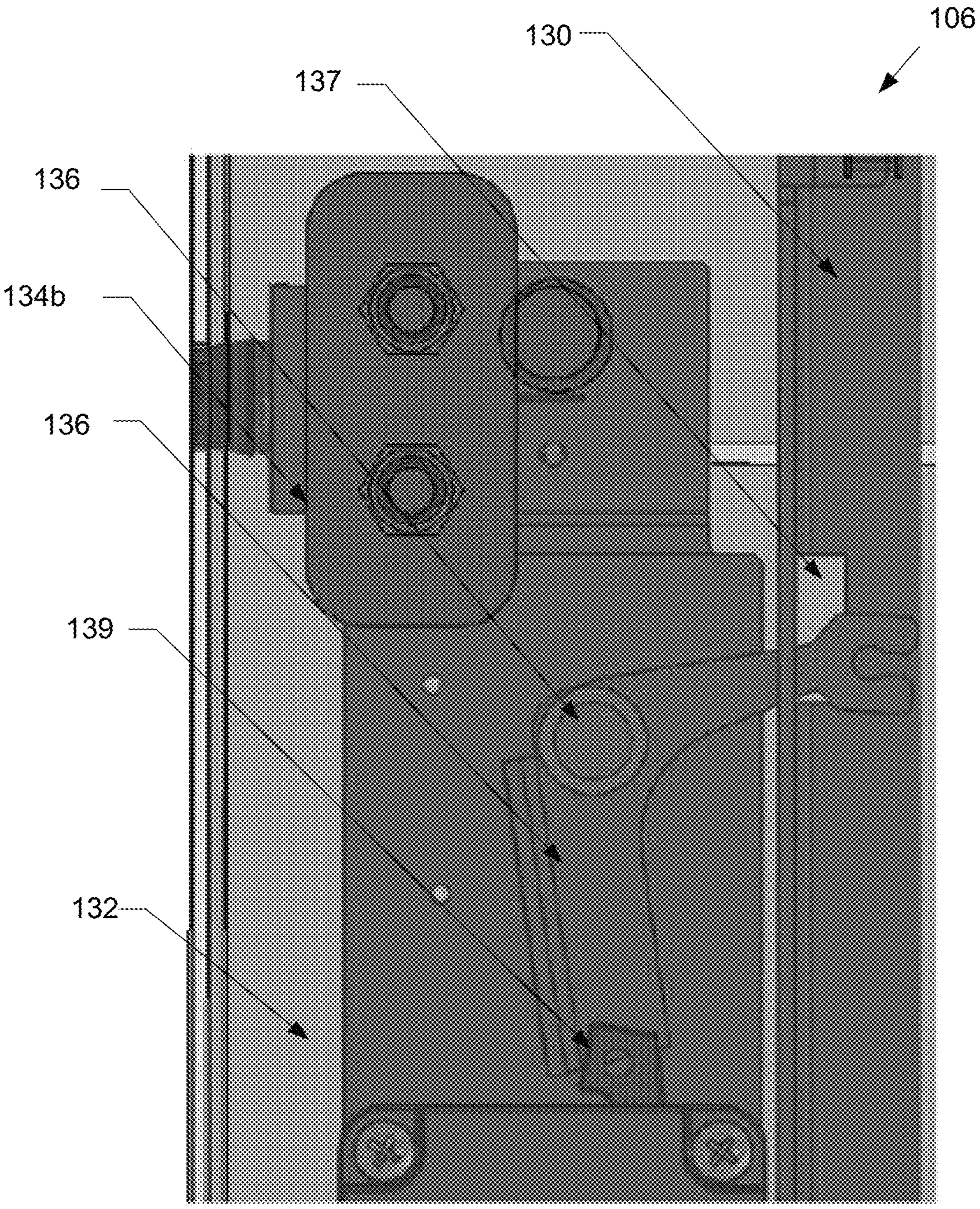
FIG. 7C depicts a close-up view of a latch assembly being released in an example of a non-routine emergency access procedure, in accordance with some example embodiments.

To further illustrate, FIGS. 7A-B depict close-up views of the plunger 116 undergoing an example of a non-routine emergency access procedure, in accordance with some example embodiments. The latch assembly 134 being released during this non-routine emergency access procedure is shown in FIG. 7C. It should be appreciated that the example of the non-routine emergency access procedure shown in FIGS. 7A-C may be performed in response to a failure of the spring 141 joining the cam bracket 136 to the lever 130. Under normal circumstances, tension from the spring 141 may allow the cam bracket 136 to rotate, as the lever 130 is shifted upwards, until the latch assembly 134 is released by the cam bracket 136 hitting the limit imposed by the lever 139. Absent tension from the spring 141, releasing the latch assembly 134 may an additional upward shift in the lever 130 in order to achieve a sufficient rotation of the cam bracket 136.

Referring again to FIGS. 7A-B, the additional upward shift in the lever 130 may be achieved by shifting the plunger 116 in the engaged position further upwards. For example, FIG. 7A depicts a perspective view of the plunger 116 in the engaged position where the plunger 116 rests atop the second finger 121*b* of the bracket 124. The additional upward shift in the lever 130 may be achieved by removing at least one of the fasteners 125 securing the bracket 124 to the side panel 126 of the dispensing cabinet 100. Doing so may allow the entire bracket 124 to be shifted upwards, while the plunger 116 continues to rest atop the second finger 121*b* of the bracket 124, to cause the lever 130 to travel the additional distance necessary to rotate the cam bracket 136 to the rotational limit (e.g., imposed by the lever 139) and release the latch assembly 134 in the absence of a functional spring 141.

Figure 8A:
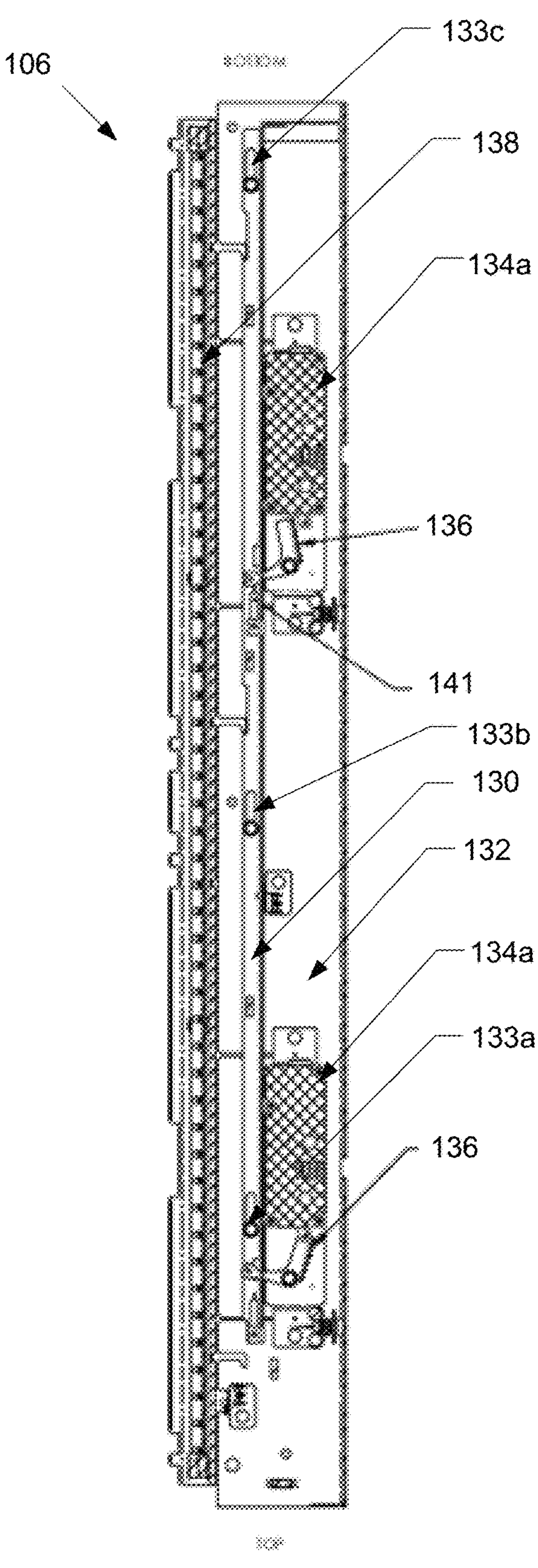
FIG. 8A depicts a planar view of an example of a U-channel assembly, in accordance with some example embodiments.
Figure 8B:
FIG. 8B depicts another planar view of an example of a U-channel assembly, in accordance with some example embodiments.
Figure 8C:
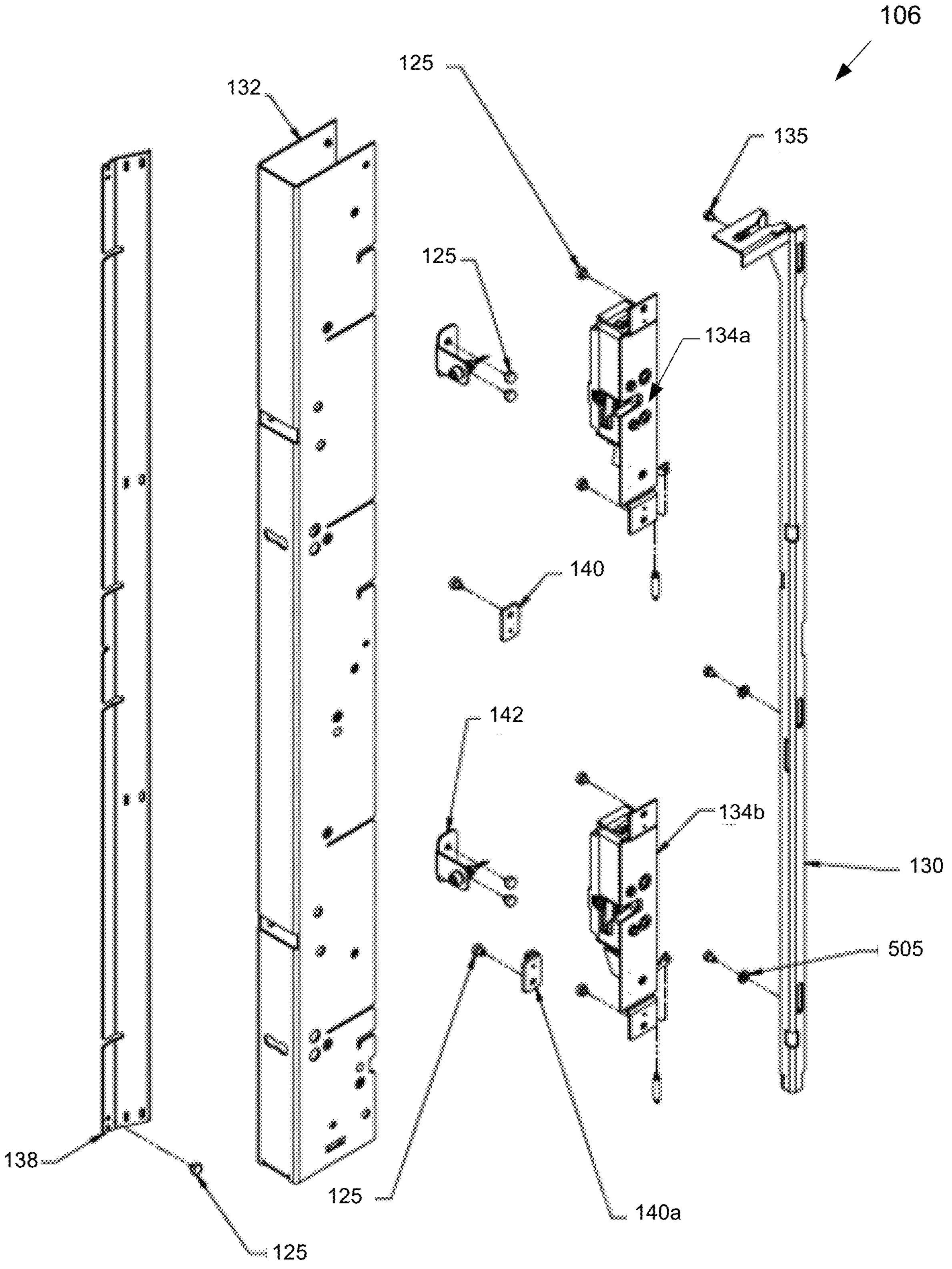
FIG. 8C depicts an exploded view of an example of a U-channel assembly, in accordance with some example embodiments.
Figure 8D:
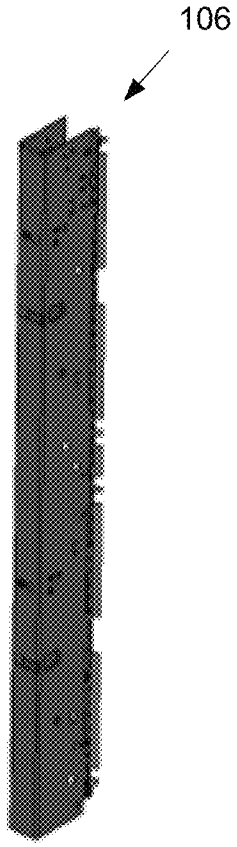
FIG. 8D depicts a perspective view of an example of a U-channel assembly with a left hinge configuration, in accordance with some example embodiments.
Figure 8E:
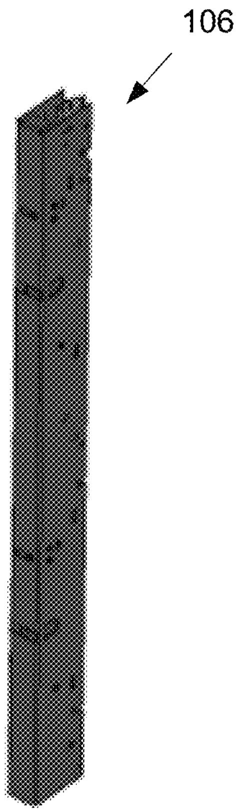
FIG. 8E depicts a perspective view of an example of a U-channel assembly with a right hinge configuration, in accordance with some example embodiments.

FIGS. 8A-E depict various views of an example of the U-channel assembly 106, in accordance with some example embodiments. In some example embodiments, the U-channel assembly 106 may have a left hand configuration as shown in FIG. 8D or a right hand configuration as shown in FIG. 8E. Moreover, as shown in FIGS. 8A-C, the U-channel assembly 106 may include a lighting bracket 138 and a light emitting diode (LED) assembly 142. The lighting bracket 138 and the light emitting diode assembly 142 may be fastened to the U-channel 132. The lighting bracket 138 and the light emitting diode assembly 142 may house one or more light emitting diodes (or other types of lights) configured to provide a visual indicator of a status of the dispensing cabinet 100. For example, the one or more light emitting diodes may display different colors and/or patterns of light to indicate when the electromechanical lock of the dispensing cabinet 100 is operational and when an alternate means for accessing the dispensing cabinet 100 may be necessary (e.g., in the event of a power outage, a software error, a mechanical failure, and/or the like).

Figure 9A:
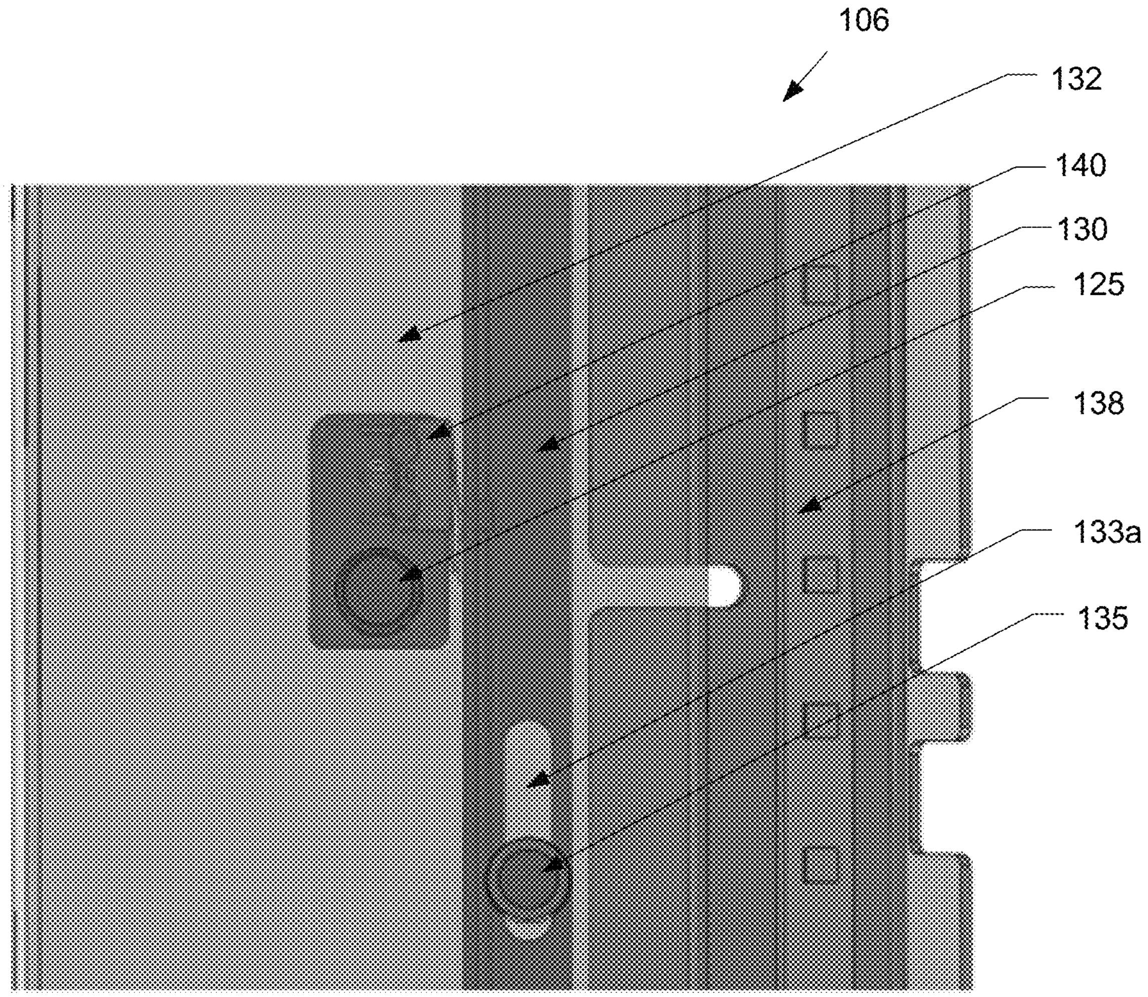
FIG. 9A depicts a planar view of a U-channel assembly an example of an access detection feature, in accordance with some example embodiments.
Figure 9B:
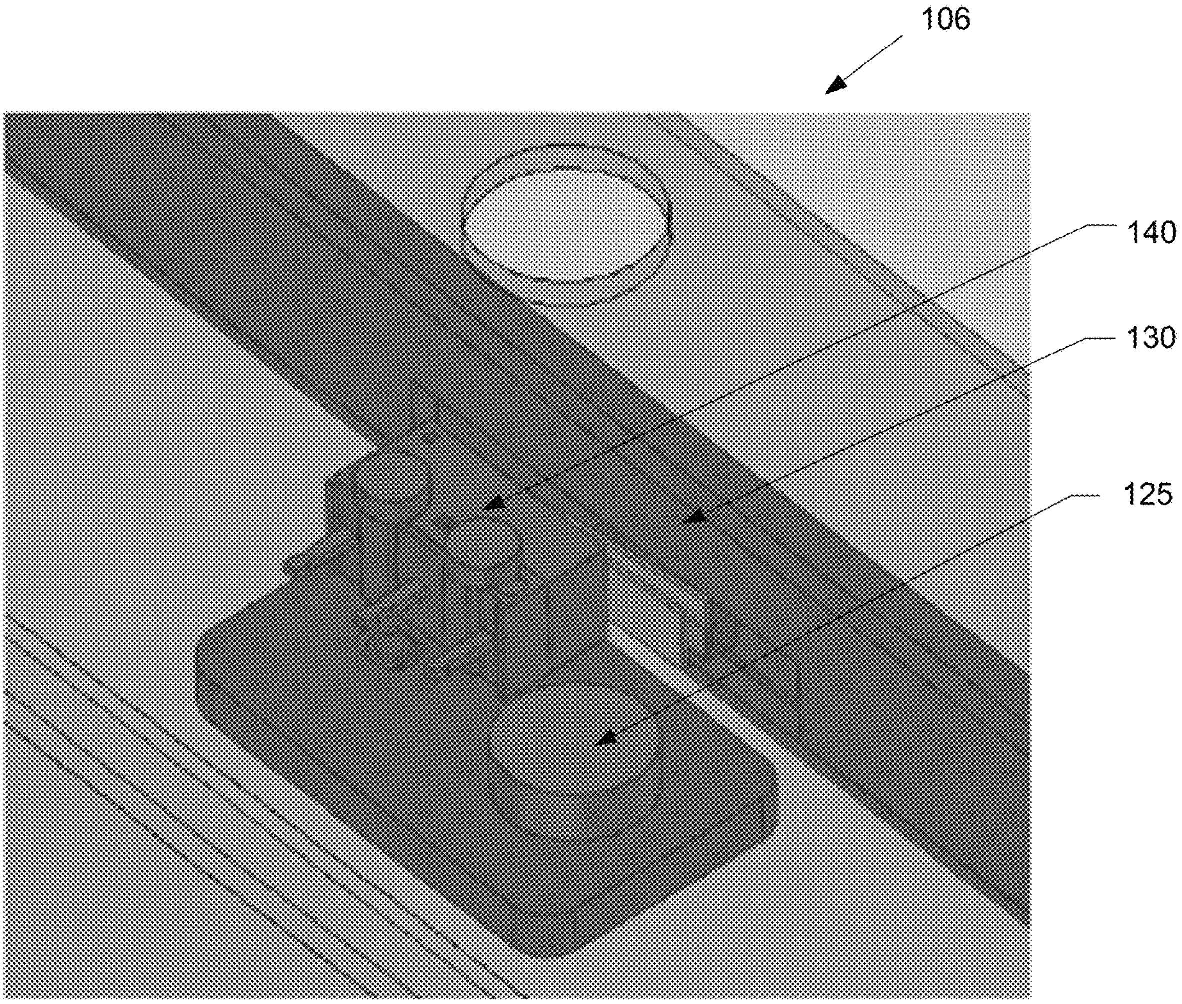
FIG. 9B depicts a perspective view of a U-channel assembly with an example of an access detection feature, in accordance with some example embodiments.

In some example embodiments, the U-channel assembly 106 may include one or more access detection features 140 configured to detect when the emergency release mechanism is engaged to release the first latch assembly 134*a* and/or the second latch assembly 134*b* and gain access to the dispensing cabinet 100. As shown in FIGS. 8C and 9A-B, the access detection feature 140 may be affixed to the U-channel 132 and configured to interface with the lever 130. For example, the access detection feature 140 may be an electromechanical switch that transitions between an open position and a closed position by the motion of the lever 130. By transitioning between the open position and the closed position, the access detection feature 140 may generate a signal when the lever 130 exhibits a threshold level of upward motion, for example, when the plunger 116 is transitioned from the disengaged position to the engaged position. Alternatively and/or additionally, the access detection feature 140 may be an optical sensor configured to respond to the movement of the lever 130 by generating a corresponding signal. The access detection feature 140 may further include corresponding software configured to process and respond to the signals generated by the electromechanical switch and/or the optical sensor, for example, by generating one or more alerts, electronic records, and/or the like.

In some example embodiments, the signal generated by the one or more access detection features 140 (or another sensor or switch) upon activation of the emergency access feature may be sent to a processor included in the dispensing cabinet 100 (or at a remote device) to indicate the engagement of the emergency access feature. The processor may respond to the engagement of the emergency access feature by generating a log whose content may include, for example, a time, a date, and/or other information to facilitate review of the dispensing cabinet 100 and contents of the dispensing cabinet 100. In some implementations, the processor may respond to the signal by triggering a visual indicator on a graphical user interface, such as the light emitting diodes (or other types of lights) included in the lighting bracket 138 and/or the light emitting diode (LED) assembly 142, to indicate that the dispensing cabinet 100 was accessed using the emergency access feature. In some implementations, the processor may adjust a dispensing workflow at the dispensing cabinet 100 after detecting the engagement of the emergency access feature. For example, the processor may prohibit any additional dispenses from the dispensing cabinet 100 until a reset code or authorization for dispensing is received. In another example, the processor may require a user to provide a count of items in one or more storage locations within the dispensing cabinet 100 before permitting further access to the dispensing cabinet 100. Once the count is received, a subsequent request for an item in the counted location may be omitted. In this way, the stock of the dispensing cabinet 100 after a potential emergency access may be confirmed and documented.

Figure 10:
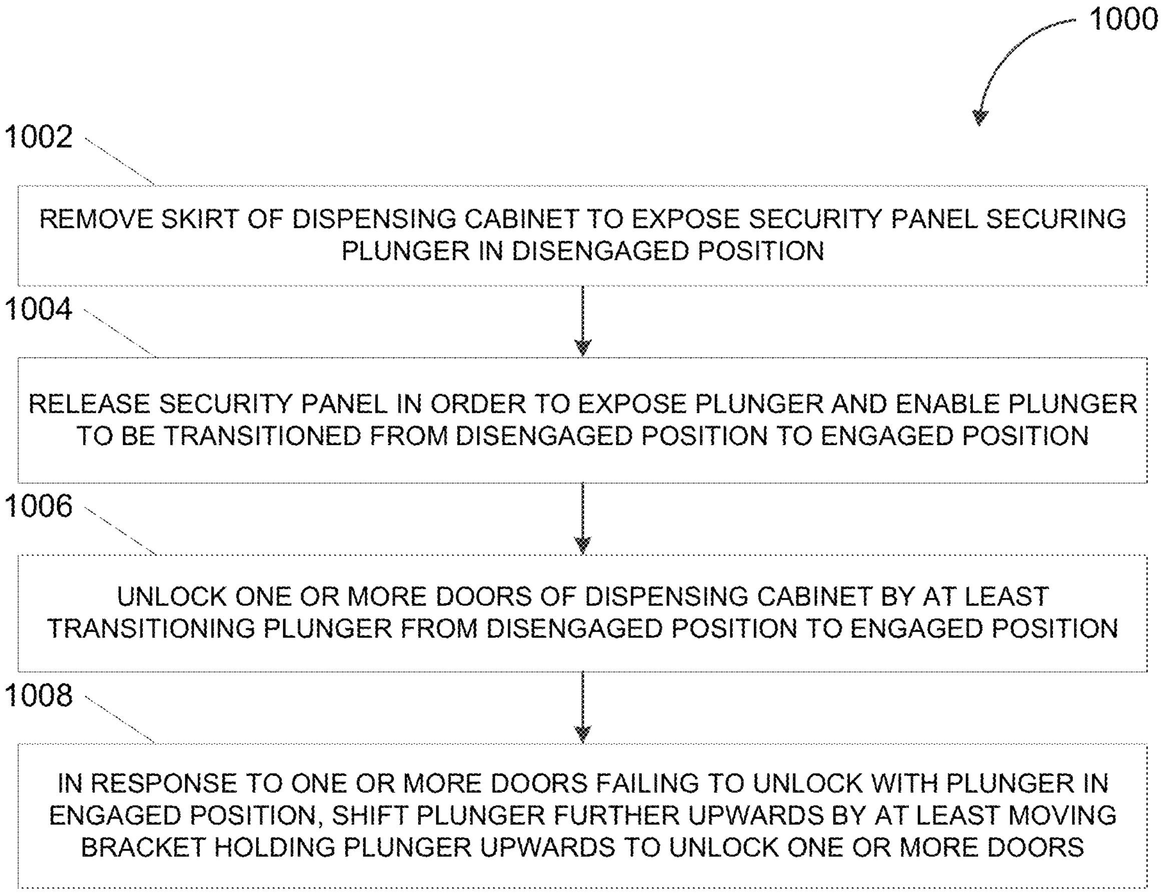
FIG. 10 depicts a flowchart illustrating an example of a process for accessing a dispensing cabinet with an emergency release feature, in accordance with some example embodiments.

FIG. 10 depicts a flowchart illustrating an example of a process 1000 for accessing a dispensing cabinet with an emergency release feature, in accordance with some example embodiments. Referring to FIGS. 1-10, the process 1000 may be performed in order to access the dispensing cabinet 100, which may include an emergency access feature to provide an alternate means of accessing the dispensing cabinet 100 when the electromechanical lock securing the dispensing cabinet 100 is rendered inoperable by an exceptional event such as a power outage, a software error, a mechanical failure, and/or the like.

At 1002, a skirt of the dispensing cabinet may be removed to expose a security panel securing a plunger in a disengaged position. In some example embodiments, in order to access the security panel 110 in the dispensing cabinet 100, the skirt 108 may be removed to expose the security panel 110. Although the plunger 116 may be visible through the cutout 107 in the security panel 110, while in a locked position, the security panel 100 may be configured to maintain the plunger 116 in the disengaged position (e.g., resting atop the first finger 121*a* of the bracket 124).

At 1004, the security panel may be released in order to expose the plunger and enable the plunger to be transitioned from the disengaged position to an engaged position. In some example embodiments, the security panel 110 may be maintained in the locked position by one or more locks including, for example, the padlock 104, the first barrel lock 112*a*, the second barrel lock 112*b*, and/or the like. The security panel 110 may be released from the locked position and, in some cases, removed from the dispensing cabinet 100, before the plunger 116 may be transitioned from the disengaged position to the engaged position in which the plunger 116 may interface with the lever 130 to unlock the first door 104*a* and/or the second door 104*b*. For example, the security panel 110 may be released by at least unlocking each one of the padlock 104, the first barrel lock 112*a*, and the second barrel lock 112*b*. Otherwise, with the security panel 110 in place, there may be insufficient room to maneuver the plunger 116 from the disengaged position to the engaged position.

At 1006, one or more doors of the dispensing cabinet may be unlocked by at least transitioning the plunger from the disengaged position to the engaged position. In some example embodiments, once the security panel 110 is released and, in some cases, removed from the dispensing cabinet 100, the plunger 116 may be transitioned to the engaged position by rotating the plunger 116 sideways and shifting the plunger 116 upwards to rest atop the second finger 121*b* of the bracket 124. Doing so may shift the lever 130, which interfaces with the plunger 116, upwards to release the first latch assembly 134*a* and the second latch assembly 134*b*. For example, the upward motion of the lever 130 may cause the cam bracket 136 in each of the first latch assembly 134*a* and the second latch assembly 134*b* to rotate to the limit imposed by the lever 139. The first latch assembly 134*a* and the second latch assembly 134*b* may be released by rotating the cam bracket 136 to the limit. As noted, releasing the first latch assembly 134*a* and the second latch assembly 134*b* may unlock the first door 104*a* and/or the second door 104*b* to provide access to the dispensing cabinet 100.

At 1008, in response to the one or more doors of the dispensing cabinet failing to unlock with the plunger in the engaged position, shift the plunger further upwards by at least moving a bracket holding the plunger upwards to unlock the one or more doors. In some example embodiments, a non-routine emergency access procedure may be deployed when the cam bracket 136 of the first latch assembly 134*a* and/or the second latch assembly 134*b* cannot be sufficiently rotated to unlock the first door 104*a* and/or the second door 104*b* of the dispensing cabinet 100. For example, absent tension from the spring 141, an additional upward shift in the lever 130 may be required in order to achieve a sufficient rotation of the cam bracket 136. This additional upward shift in the lever 130 may be achieved by shifting the plunger 116 in the engaged position further upwards. For instance, by removing at least one of the fasteners 125 securing the bracket 124 to the side panel 126 of the dispensing cabinet 100, the entire bracket 124 may be shifted upwards, while the plunger 116 is already in the engaged position resting atop the second finger 121*b* of the bracket 124, to cause the lever 130 to travel the additional distance necessary to rotate the cam bracket 136 to the limit imposed by the lever 139.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Item 1: A dispensing cabinet, comprising: a security panel; a plunger having a disengaged position and an engaged position, the plunger being secured in the disengaged position by the security panel, and wherein the security panel is released in order to transition the plunger from the disengaged position to the engaged position; and a first lever configured to interface with the plunger and a first latch assembly, the first lever configured to shift upwards in response to the plunger being transitioned from the disengaged position to the engaged position, and an upward motion of the first lever releasing the first latch assembly to unlock the dispensing cabinet.

Item 2: The dispensing cabinet of Item 1, wherein the first latch assembly includes a cam bracket, and wherein the upward motion of the first lever releases the first latch assembly by at least rotating the cam bracket to a limit.

Item 3: The dispensing cabinet of Item 2, wherein the first latch assembly further includes a second lever configured to prevent the cam bracket from rotating beyond the limit.

Item 4: The dispensing cabinet of any one of Items 2 to 3, further comprising: a spring coupling the first lever and the cam bracket, the cam bracket being disposed at least partially inside a slot in the first lever, and the cam bracket being rotated by a tension of the spring against the cam bracket while the first lever is shifted upwards by the plunger transitioning to the engaged position.

Item 5: The dispensing cabinet of any one of Items 2 to 4, further comprising: a bracket secured to a side panel of the dispensing cabinet, the bracket including a first finger configured to support the plunger in the disengaged position and a second finger configured to support the plunger in the engaged position.

Item 6: The dispensing cabinet of Item 5, wherein the cam bracket is rotated to the limit to unlock the dispensing cabinet by at least moving the bracket upwards while the plunger is in the disengaged position.

Item 7: The dispensing cabinet of any one of Items 1 to 6, wherein the security panel is released by at least unlocking one or more locks maintaining the security panel in a locked position.

Item 8: The dispensing cabinet of Item 7, wherein the one or more locks include a padlock, and wherein the dispensing cabinet includes a staple configured to engage with a shackle of the padlock.

Item 9: The dispensing cabinet of any one of Items 7 to 8, wherein the one or more locks include a barrel lock in the security panel, and wherein the barrel lock includes a cam configured to engage with a slot in a sheet metal assembly in the dispensing cabinet.

Item 10: The dispensing cabinet of any one of Items 7 to 9, wherein the security panel includes a tamper guard to prevent unauthorized access to the one or more locks.

Item 11: The dispensing cabinet of Item 10, wherein the tamper guard comprises one or more pieces of material forming at least a partial enclosure around the one or more locks.

Item 12: The dispensing cabinet of any one of Items 1 to 11, further comprising a skirt concealing at least a portion of the security panel.

Item 13: The dispensing cabinet of any one of Items 1 to 12, wherein the plunger is visible through a cutout in the security panel.

Item 14: The dispensing cabinet of any one of Items 1 to 13, wherein the first lever is configured to interface with a second latch assembly, and wherein the upward motion of the first lever further releases the second latch assembly to unlock the dispensing cabinet.

Item 15: The dispensing cabinet of any one of Items 1 to 14, wherein the release of the first latch assembly unlocks one or more doors comprising the dispensing cabinet.

Item 16: The dispensing cabinet of any one of Items 1 to 15, wherein the first lever and the first latch assembly are disposed inside a U-channel to form a U-channel assembly.

Item 17: The dispensing cabinet of Item 16, wherein the U-channel assembly and the plunger are disposed on one side of the dispensing cabinet, and wherein a hinge of one or more doors of the dispensing cabinet is disposed on an opposite side of the dispensing cabinet.

Item 18: The dispensing cabinet of any one of Items 1 to 17, further comprising: an access detection feature configured to generate a signal in response to the upward motion of the first lever.

Item 19: The dispensing cabinet of Item 18, wherein the access detection feature comprises an electromechanical switch configured to transition between an open position and a closed position in response to the upward motion of the first lever.

Item 20: The dispensing cabinet of any one of Items 18 to 19, wherein the access detection feature comprises an optical sensor configured to detect the upward motion of the first lever.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A dispensing cabinet, comprising:

a security panel;

a plunger having a disengaged position and an engaged position, the plunger being secured in the disengaged position by the security panel, and wherein the security panel is released in order to transition the plunger from the disengaged position to the engaged position, wherein the plunger is visible through a cutout in the security panel; and a first lever configured to interface with the plunger and a first latch assembly, the first lever configured to shift upwards in response to the plunger being transitioned from the disengaged position to the engaged position, and an upward motion of the first lever releasing the first latch assembly to unlock the dispensing cabinet.

2. The dispensing cabinet of claim 1, wherein the first latch assembly includes a cam bracket, and wherein the upward motion of the first lever releases the first latch assembly by at least rotating the cam bracket to a limit.

3. The dispensing cabinet of claim 2, wherein the first latch assembly further includes a second lever configured to prevent the cam bracket from rotating beyond the limit.

4. The dispensing cabinet of claim 2, further comprising:

a spring coupling the first lever and the cam bracket, the cam bracket being disposed at least partially inside a slot in the first lever, and the cam bracket being rotated by a tension of the spring against the cam bracket while the first lever is shifted upwards by the plunger transitioning to the engaged position.

5. The dispensing cabinet of claim 2, further comprising:

a bracket secured to a side panel of the dispensing cabinet, the bracket including a first finger configured to support the plunger in the disengaged position and a second finger configured to support the plunger in the engaged position.

6. The dispensing cabinet of claim 5, wherein the cam bracket is rotated to the limit to unlock the dispensing cabinet by at least moving the bracket upwards while the plunger is in the disengaged position.

7. The dispensing cabinet of claim 1, wherein the security panel is released by at least unlocking one or more locks maintaining the security panel in a locked position.

8. The dispensing cabinet of claim 7, wherein the one or more locks include a padlock, and wherein the dispensing cabinet includes a staple configured to engage with a shackle of the padlock.

9. The dispensing cabinet of claim 7, wherein the one or more locks include a barrel lock in the security panel, and wherein the barrel lock includes a cam configured to engage with a slot in a sheet metal assembly in the dispensing cabinet.

10. The dispensing cabinet of claim 7, wherein the security panel includes a tamper guard to prevent unauthorized access to the one or more locks.

11. The dispensing cabinet of claim 10, wherein the tamper guard comprises one or more pieces of material forming at least a partial enclosure around the one or more locks.

12. The dispensing cabinet of claim 1, further comprising a skirt concealing at least a portion of the security panel.

13. The dispensing cabinet of claim 1, wherein the first lever is configured to interface with a second latch assembly, and wherein the upward motion of the first lever further releases the second latch assembly to unlock the dispensing cabinet.

14. The dispensing cabinet of claim 1, wherein the release of the first latch assembly unlocks one or more doors comprising the dispensing cabinet.

15. The dispensing cabinet of claim 1, wherein the first lever and the first latch assembly are disposed inside a U-channel to form a U-channel assembly.

16. The dispensing cabinet of claim 15, wherein the U-channel assembly and the plunger are disposed on one side of the dispensing cabinet, and wherein a hinge of one or more doors of the dispensing cabinet is disposed on an opposite side of the dispensing cabinet.

17. The dispensing cabinet of claim 1, further comprising:

an access detection feature configured to generate a signal in response to the upward motion of the first lever.

18. The dispensing cabinet of claim 17, wherein the access detection feature comprises an electromechanical switch configured to transition between an open position and a closed position in response to the upward motion of the first lever.

19. The dispensing cabinet of claim 17, wherein the access detection feature comprises an optical sensor configured to detect the upward motion of the first lever.

20. A dispensing cabinet, comprising:

a security panel;

a plunger having a disengaged position and an engaged position, the plunger being secured in the disengaged position by the security panel, and wherein the security panel is released in order to transition the plunger from the disengaged position to the engaged position; and a first lever configured to interface with the plunger and a first latch assembly, the first lever configured to shift upwards in response to the plunger being transitioned from the disengaged position to the engaged position, and an upward motion of the first lever releasing the first latch assembly to unlock the dispensing cabinet;

a bracket secured to a side panel of the dispensing cabinet, the bracket including a first finger configured to support the plunger in the disengaged position and a second finger configured to support the plunger in the engaged position;

wherein the first latch assembly includes a cam bracket, and wherein the upward motion of the first lever releases the first latch assembly by at least rotating the cam bracket to a limit and wherein the cam bracket is rotated to the limit to unlock the dispensing cabinet by at least moving the bracket upwards while the plunger is in the disengaged position.

21. The dispensing cabinet of claim 20, wherein the first latch assembly further includes a second lever configured to prevent the cam bracket from rotating beyond the limit.

22. The dispensing cabinet of claim 20, further comprising:

a spring coupling the first lever and the cam bracket, the cam bracket being disposed at least partially inside a slot in the first lever, and the cam bracket being rotated by a tension of the spring against the cam bracket while the first lever is shifted upwards by the plunger transitioning to the engaged position.

23. The dispensing cabinet of claim 20, wherein the security panel is released by at least unlocking one or more locks maintaining the security panel in a locked position.

24. The dispensing cabinet of claim 23, wherein the one or more locks include a padlock, and wherein the dispensing cabinet includes a staple configured to engage with a shackle of the padlock.

25. The dispensing cabinet of claim 23, wherein the one or more locks include a barrel lock in the security panel, and wherein the barrel lock includes a cam configured to engage with a slot in a sheet metal assembly in the dispensing cabinet.

26. The dispensing cabinet of claim 23, wherein the security panel includes a tamper guard to prevent unauthorized access to the one or more locks.

27. The dispensing cabinet of claim 26, wherein the tamper guard comprises one or more pieces of material forming at least a partial enclosure around the one or more locks.

28. The dispensing cabinet of claim 20, further comprising a skirt concealing at least a portion of the security panel.

29. The dispensing cabinet of claim 20, wherein the plunger is visible through a cutout in the security panel.

30. The dispensing cabinet of claim 20, wherein the first lever is configured to interface with a second latch assembly, and wherein the upward motion of the first lever further releases the second latch assembly to unlock the dispensing cabinet.

31. The dispensing cabinet of claim 20, wherein the release of the first latch assembly unlocks one or more doors comprising the dispensing cabinet.

32. The dispensing cabinet of claim 20, wherein the first lever and the first latch assembly are disposed inside a U-channel to form a U-channel assembly.

33. The dispensing cabinet of claim 32, wherein the U-channel assembly and the plunger are disposed on one side of the dispensing cabinet, and wherein a hinge of one or more doors of the dispensing cabinet is disposed on an opposite side of the dispensing cabinet.

34. The dispensing cabinet of claim 20, further comprising:

an access detection feature configured to generate a signal in response to the upward motion of the first lever.

35. The dispensing cabinet of claim 34, wherein the access detection feature comprises an electromechanical switch configured to transition between an open position and a closed position in response to the upward motion of the first lever.

36. The dispensing cabinet of claim 34, wherein the access detection feature comprises an optical sensor configured to detect the upward motion of the first lever.

* * * * *